United States Patent
Sundell et al.

(10) Patent No.: US 12,254,698 B2
(45) Date of Patent: *Mar. 18, 2025

(54) SECURITY EVENT PROCESSING

(71) Applicant: SimpliSafe, Inc., Boston, MA (US)

(72) Inventors: Daniel Reid Sundell, Medford, MA (US); Jordan Theodore Thayer, Hopkinton, MA (US); Jason Andrew Carter, Crestwood, KY (US)

(73) Assignee: SimpliSafe, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,071

(22) Filed: Jan. 5, 2024

(65) Prior Publication Data

US 2024/0257522 A1 Aug. 1, 2024

Related U.S. Application Data

(63) Continuation of application No. 18/228,861, filed on Aug. 1, 2023, now Pat. No. 11,908,196.

(60) Provisional application No. 63/441,960, filed on Jan. 30, 2023.

(51) Int. Cl.
*G06V 20/52* (2022.01)
*G06V 20/40* (2022.01)
*H04N 21/2187* (2011.01)

(52) U.S. Cl.
CPC ............. *G06V 20/52* (2022.01); *G06V 20/44* (2022.01); *H04N 21/2187* (2013.01)

(58) Field of Classification Search
CPC ........ G06V 20/52; G06V 20/44; G06V 40/20; H04N 21/2187; H04N 5/76; H04N 5/77; H04N 9/8205; H04N 23/662; H04N 23/90; G08B 13/19606; G08B 13/19602; G08B 13/19634; G08B 13/19669; H04L 67/306

See application file for complete search history.

(56) References Cited

U.S. PATENT DOCUMENTS

| | | | |
|---|---|---|---|
| 2006/0271695 A1 | 11/2006 | Lavian | |
| 2008/0303903 A1 | 12/2008 | Bentley et al. | |
| 2009/0295572 A1* | 12/2009 | Grim, III | G08B 25/006 340/540 |
| 2014/0232861 A1* | 8/2014 | Naidoo | H04L 12/2836 348/143 |

(Continued)

FOREIGN PATENT DOCUMENTS

| | | |
|---|---|---|
| CN | 105103204 A | 11/2015 |
| CN | 108271082 A | 7/2018 |

OTHER PUBLICATIONS

International Search Report and Written Opinion issued Apr. 2, 2024 for International Patent Application No. PCT/US2023/086340.

(Continued)

*Primary Examiner* — Alazar Tilahun
(74) *Attorney, Agent, or Firm* — Pierce Atwood LLP

(57) ABSTRACT

In accordance with one disclosed method, a computing system may cause a first computing device to display a first notification of a first event detected at a monitored location, and may cause a second computing device to display a second notification of a second event detected at the monitored location. The computing system may additionally cause the second computing device to cease display of the second notification in response to a change of status of the first event.

20 Claims, 15 Drawing Sheets

(56) References Cited

U.S. PATENT DOCUMENTS

| | | |
|---|---|---|
| 2015/0304364 A1 | 10/2015 | Wang et al. |
| 2017/0039841 A1* | 2/2017 | Wilson et al. |
| 2018/0012462 A1* | 1/2018 | Heitz, III ............... G06V 40/20 |
| 2018/0061220 A1* | 3/2018 | Greene .................. G06V 20/52 |
| 2018/0102045 A1* | 4/2018 | Simon .................. G08B 29/188 |
| 2022/0051548 A1 | 2/2022 | Pellegrini et al. |

OTHER PUBLICATIONS

Humann, et al., "Modeling and Simulation of multi-UAV, multi-Operator Surveillance Systems", 2018 Annual IEEE International Systems Conference (SYSCON), IEEE, Apr. 23, 2018, p. 1-8.

First Office Action mailed Jan. 18, 2025, for Chinese Patent Application No. 202380034298.5.

\* cited by examiner

| | 304 | 306 | 308 | 310 | 312 | 314 | 316 | 318 | 320 |
|---|---|---|---|---|---|---|---|---|---|
| | Event ID | Timestamp | Location ID | Camera ID | Image Data | Other Data | Status | Linked Event(s) | Agent ID |
| | E1 | T1 | L1 | C1 | ID1 | OD1 | Reviewing | N/A | A1 |
| | E2 | T2 | L1 | C2 | ID2 | OD2 | Hold | E1 | Unassigned |
| | E3 | T3 | L2 | C3 | ID3 | OD3 | New | N/A | A3 |
| | E4 | T4 | L1 | C1 | ID3 | OD4 | Hold | E1 | Unassigned |

FIG. 4A

| | 304 | 306 | 308 | 310 | 312 | 314 | 316 | 318 | 320 |
|---|---|---|---|---|---|---|---|---|---|
| | Event ID | Timestamp | Location ID | Camera ID | Image Data | Other Data | Status | Linked Event(s) | Agent ID |
| | E1 | T1 | L1 | C1 | ID1 | OD1 | Clear | N/A | Unassigned |
| | E2 | T2 | L1 | C2 | ID2 | OD2 | Clear | E1 | Unassigned |
| | E3 | T3 | L2 | C3 | ID3 | OD3 | Threat | N/A | Unassigned |
| | E4 | T4 | L1 | C1 | ID3 | OD4 | Clear | E1 | Unassigned |

FIG. 4B

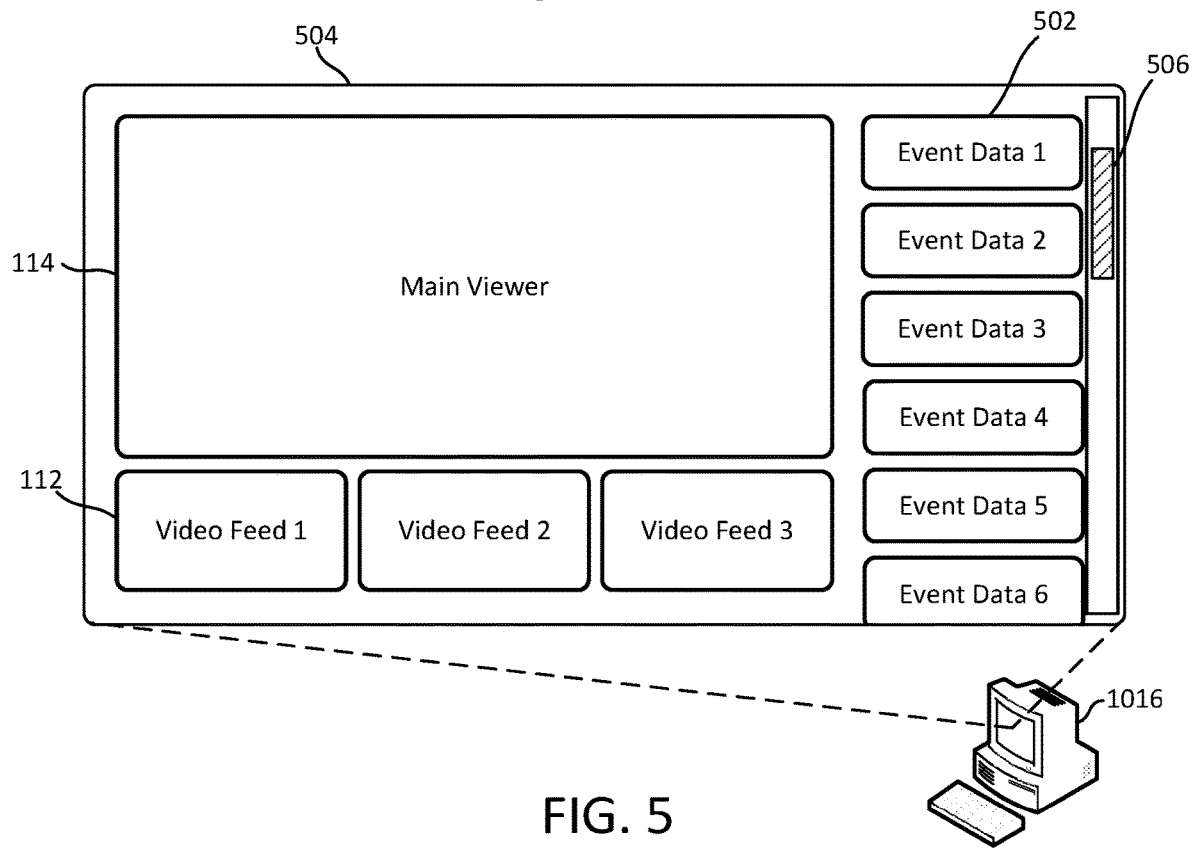

FIG. 5

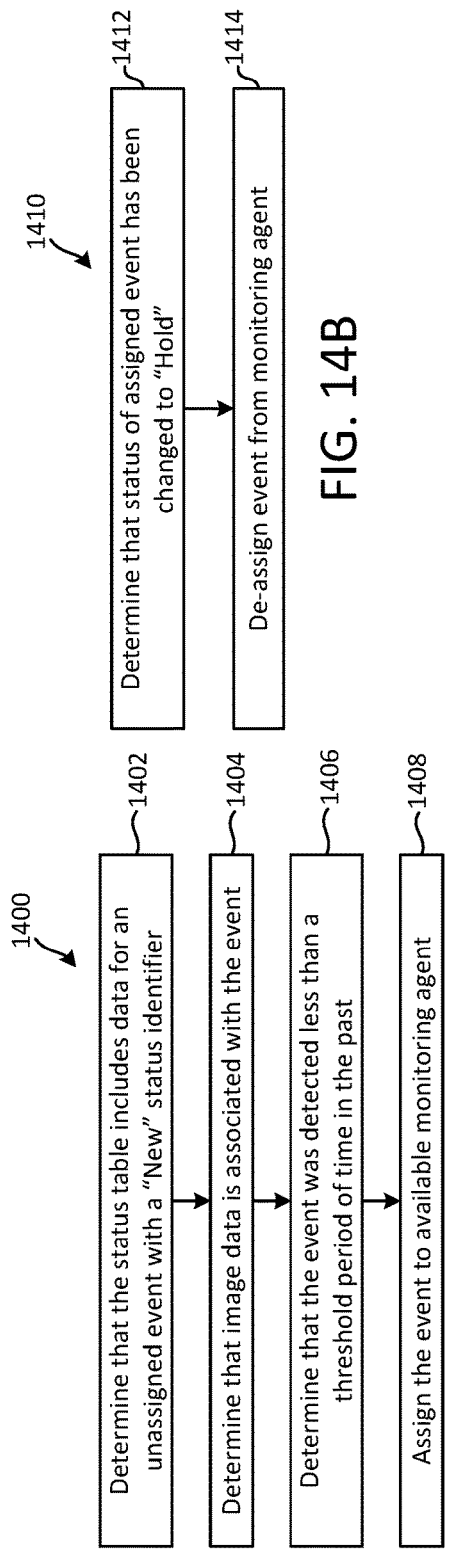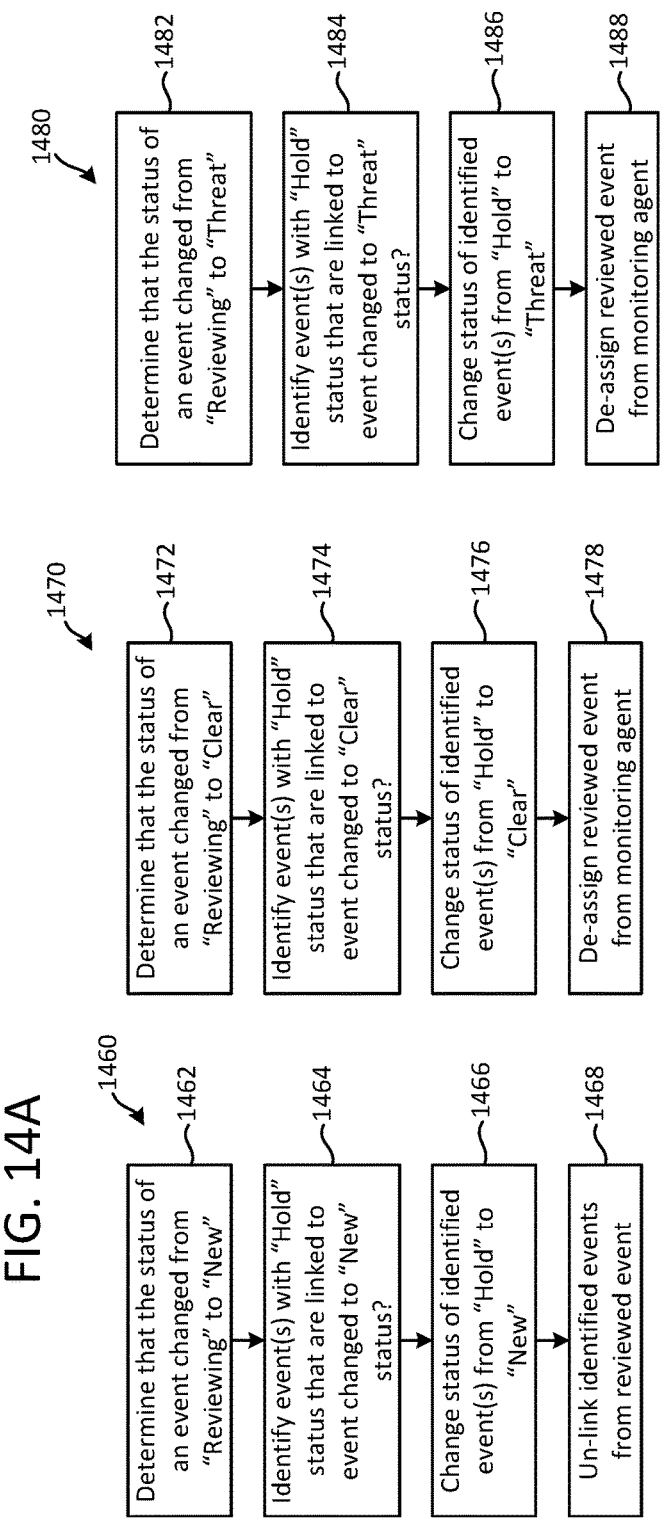

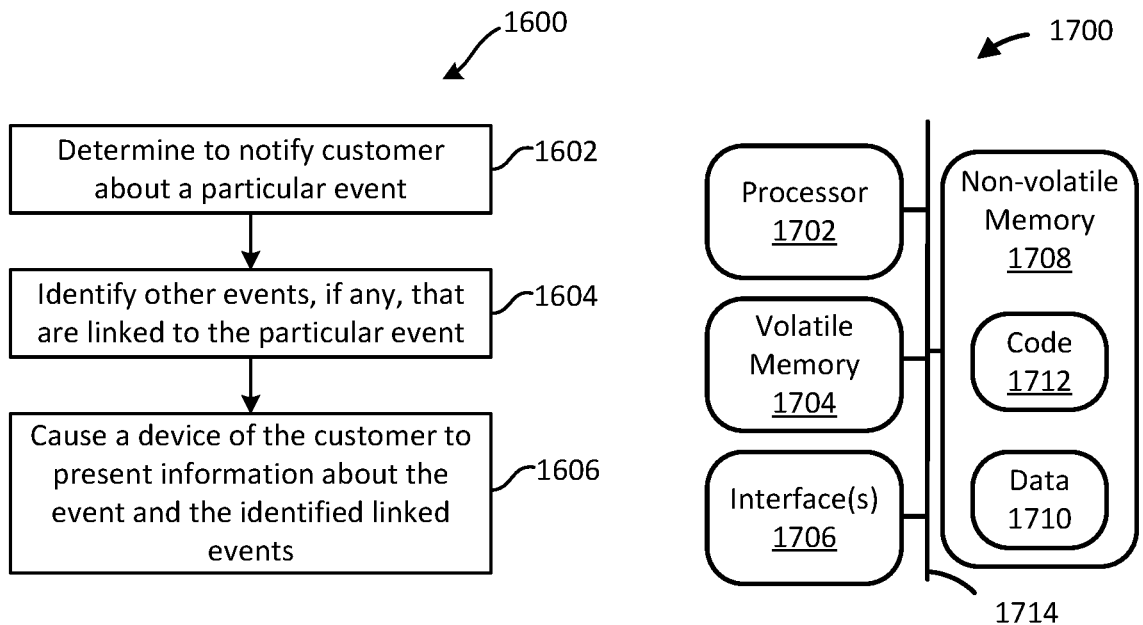
FIG. 16
FIG. 17
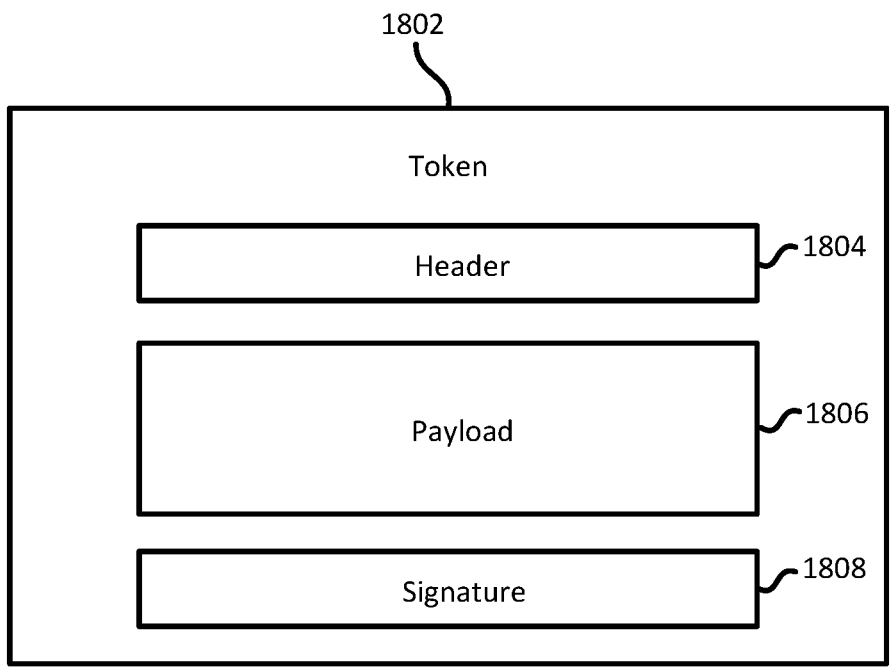
FIG. 18

SECURITY EVENT PROCESSING

CROSS-REFERENCE TO RELATED APPLICATIONS

This application is a continuation of and claims the benefit under 35 U.S.C. § 120 of U.S. application Ser. No. 18/228,861, entitled SECURITY EVENT PROCESSING, filed Aug. 1, 2023, which claims the benefit under 35 U.S.C. § 119(e) of U.S. Provisional Application Ser. No. 63/441,960, entitled SECURITY EVENT PROCESSING, filed Jan. 30, 2023, the entire contents of each of which are incorporated herein by reference.

BACKGROUND

Some security systems enable remote monitoring of locations using cameras and other equipment.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 4A shows an example of how information in the table shown in FIG. 3 can be modified when a monitoring agent is actively reviewing an event to streamline the dispatching of notifications of events to other monitoring applications for review by other monitoring agents, according to some implementations of the present disclosure.

FIG. 4B shows an example of how the information in the table shown in FIG. 4A can be changed when a monitoring agent determines that an event does or does not present a security concern, according to some implementations of the present disclosure.

FIG. 5 shows an example screen that may be presented by a monitoring device operated by a monitoring agent when the monitoring agent is actively reviewing an event, according to some implementations of the present disclosure.

FIG. 14A is a flowchart showing an example routine that may be performed by one or more components of the surveillance service described herein to cause events to be added to the review queues of available monitoring agents based on the current contents of the status table shown in FIG. 3.

FIG. 14B is a flowchart showing an example routine that may be performed by one or more components of the surveillance service described herein to cause events to be removed from the review queues of monitoring agents based on the current contents of the status table shown in FIG. 3.

FIG. 14E is a flowchart showing an example routine that may be performed by one or more components of the surveillance service described herein to update that status indicators in the status table shown in FIG. 3 of events that are linked to an event has been actively reviewed by a monitoring agent in response to a change to the status indicator for the actively reviewed event from "Reviewing" to "New."

FIG. 14F is a flowchart showing an example routine that may be performed by one or more components of the surveillance service described herein to update that status indicators in the status table shown in FIG. 3 of events that are linked to an event has been actively reviewed by a monitoring agent in response to a change to the status indicator for the actively reviewed event from "Reviewing" to "Clear."

FIG. 14G is a flowchart showing an example routine that may be performed by one or more components of the surveillance service described herein to update that status indicators in the status table shown in FIG. 3 of events that are linked to an event has been actively reviewed by a monitoring agent in response to a change to the status indicator for the actively reviewed event from "Reviewing" to "Threat."

FIG. 16 is a flowchart showing an example routine that may performed by one or more components of the surveillance service disclosed herein to cause a device operated by a customer to present information about detected events at a monitored location in a grouped fashion.

FIG. 17 is a schematic diagram of a computing device that may be used to implement a customer device, a monitoring device, and/or one or more of the services of the of the security system shown in FIG. 6, according to some implementations of the present disclosure.

FIG. 18 shows an example token that may be employed by various components of the system disclosed herein, according to some implementations of the present disclosure.

SUMMARY

Figure 1:
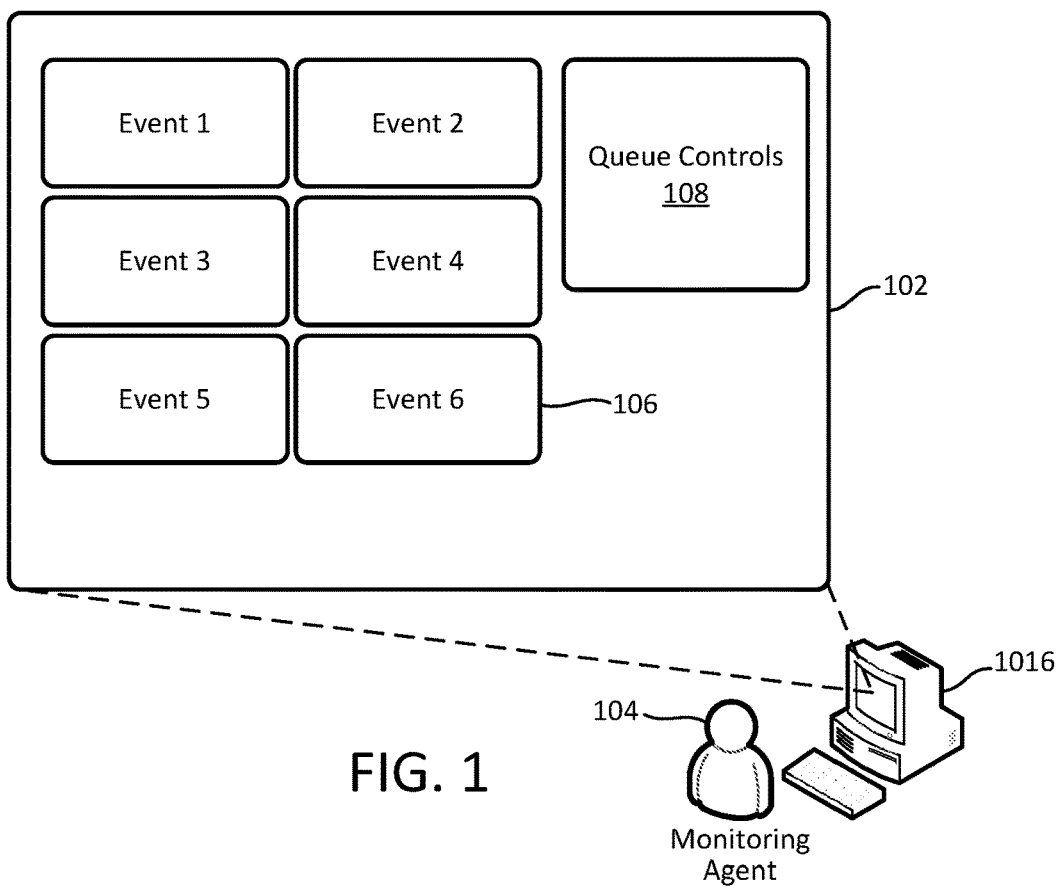
FIG. 1 shows a first example screen that may be displayed by a monitoring device to indicate certain events detected by a security system, according to some implementations of the present disclosure.

In some disclosed embodiments, a method involves causing, by a computing system, a first computing device to display a first notification of a first event detected at a monitored location; causing, by the computing system, a second computing device to display a second notification of a second event detected at the monitored location; and causing, by the computing system, the second computing device to cease display of the second notification in response to a change of status of the first event.

In some disclosed embodiments, a system comprises at least one processor, and at least one computer-readable medium encoded with instructions which, when executed by the at least one processor, cause the system to cause a first computing device to display a first notification of a first event detected at a monitored location, to cause a second computing device to display a second notification of a second event detected at the monitored location, and to cause the second computing device to cease display of the second notification in response to a change of status of the first event.

In some disclosed embodiments, a method involves determining, by a computing system, that a first computing device received an input associated with a first notification, the first notification being indicative of a first event detected at a location; based at least in part on receipt of the input, causing, by the computing system, a second computing device to cease display of a second notification, the second notification being indicative of a second event, different from the first event, at the location.

DETAILED DESCRIPTION

Existing security systems use cameras and other sensors to monitor a location for various reasons. Some such systems are configured to detect the occurrence of certain phenomena, e.g., motion and/or sound, within or around the monitored location, and are further configured to send event notifications and possibly associated image data to a remote location for processing and/or review by human monitoring agents. Monitoring agents may review the event notifications and their associated images (e.g., still images and/or recorded video clips) and/or recorded audio to ascertain whether individual event notifications raise actual security concerns or were instead generated for innocuous reasons, such as pets or other animals, visiting neighbors, trees moving in strong winds, delivery personnel, door-to-door salespeople, etc. As used herein, a "security concern" may refer to any circumstance that a customer is likely to consider unacceptable from a safety, security, or well-being perspective, such a burglary attempt, package theft attempt, a vandalism attempt, a neighbor's pet defecating on the lawn, a stranger peering through windows, etc.

Offered is a system in which a monitoring agent, upon determining that a notification (e.g., an event notification) raises a potential security concern, may additionally review live video and/or audio from a location to evaluate whether the detected event raises a security concern. For example, in some implementations, the system may allow a computing device operated by the monitoring agent to establish peer-to-peer connections with one or more cameras at the location, e.g., to enable the streaming of video data and/or audio data between the monitoring agent's computing device and the camera(s).

Further, in some implementations, the system disclosed herein may control the distribution of event notifications to monitoring agents so as to minimize the number of human agents that are needed to competently review event notifications (and any associated images and/or audio) to ascertain whether individual event notifications raise actual security concerns or were instead generated for innocuous reasons.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 shows an example screen 102 that may be presented on a computer or other monitoring device 1016 (described below in connection with FIG. 10) within a security system 600 (shown in FIG. 6) that is configured in accordance with certain aspects of the present disclosure. As shown, the monitoring device 1016 may be operated by a monitoring agent 104, and the screen 102 may include a set of event windows 106 corresponding to respective events that are currently in the agent's queue for review. In some implementations, for example, the individual event windows 106 may be configured to play back recorded video clips corresponding to respective events that were detected at various monitored locations. As used herein, a "monitored location" may correspond to a particular location (e.g., a house and associated lot, an office space, etc.) that is monitored for security purposes. A given monitored location may, for example, be associated with a particular customer identifier.

As shown in FIG. 1, in some configurations, the screen 102 may include a queue controls interface 108 that includes one or more user interface (UI) elements to allow the monitoring agent 104 to control various aspects of that agent's queue, such as a maximum number of notifications that can be added to the agent's queue for presentation in respective event windows 106. In some implementations, event notifications may be distributed to individual monitoring agents 104, who are included in a pool of available monitoring agents 104, so that all of the available monitoring agents 104 have roughly the same number of events in their review queue at a given time.

A camera 604 of a security system 600 (see FIG. 6) may be triggered by a person coming within the field of view (FOV) of the camera 604 and may record a video signal for a period of time, e.g., until the person has left the camera's FOV. A video clip for such an occurrence may be stored (e.g., within the image data store 1004 shown in FIG. 10) and associated with or tagged to an event. A notification of that event may then be added to the review queue for a monitoring agent 104, e.g., by presenting the recorded video clip for the detected event within one of the event windows 106 shown in FIG. 1. In some implementations, such recorded video clips may, at least initially, be configured and/or played back at an increased rate (e.g., two times standard speed) to increase the rate at which monitoring agents 104 can review the video clips for potential threats.

Upon reviewing one of the event windows 106, e.g., by viewing a recorded video clip corresponding to detected motion, the monitoring agent 104 may determine that no potential security threat exists and provide an input instructing monitoring device 1016 to cause the event notification to be removed from the agent's review queue, thus freeing up the corresponding event window 106 to display another event notification. In some implementations, the monitoring agent 104 may identify reasons why individual notifications are to be removed from the agent's queue, e.g., by selecting an option from a dropdown menu presented upon providing an input to close a notification. Examples of such reasons include "delivery person," "leaving/arriving home," "no person," "passerby," etc.

Alternatively, upon reviewing one of the event windows 106, e.g., by viewing a recorded video clip corresponding to detected motion, the monitoring agent 104 may determine that a potential threat or other security concern (referred to herein as an "incident") exists and decide to take responsibility for reviewing the incident (to the exclusion of other monitoring agents 104), such as by reviewing live video and/or audio from the monitored location 602 at which the video clip was recorded. The monitoring agent 104 may acquire exclusive custody of the incident, for example, by selecting the event window 106 in which the recorded video in question is being played or otherwise displayed. In response to such a selection, the monitoring device 1016 may begin to receive live video and/or audio streamed from one or more cameras at the monitored location 602 and/or the monitoring agent 104 may otherwise be provided with additional data (e.g., other recorded video and/or audio clips, still images, sensor data, artificial intelligence (AI) evaluation results, etc.) enabling the monitoring agent 104 to evaluate whether the incident presents an actual security risk. In some implementations, for example, one or more peer-to-peer connections may be established between one or more cameras 604 (shown in FIG. 6) at the monitored location and the monitoring device 1016, e.g., using web real-time communication (WebRTC) functionality of a browser on the monitoring device 1016, to enable the streaming of video data and/or audio data between such camera(s) and the monitoring device 1016. An example process for securely establishing a peer-to-peer connection between the monitoring device 1016 and a camera 604 to enable such live-streaming is described below in connection with FIGS. 12 and 13.

Figure 2:
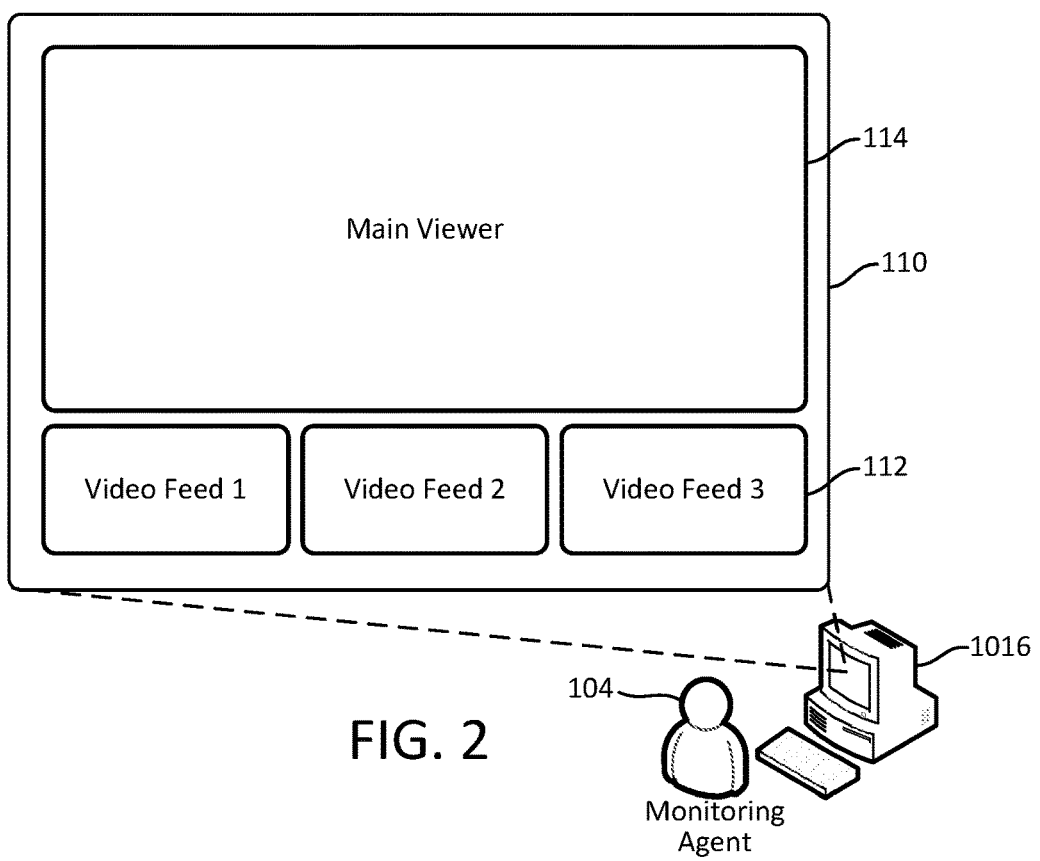
FIG. 2 shows a second example screen that may be displayed by a monitoring device to present live video feeds from a location monitored by a security system, according to some implementations of the present disclosure.

FIG. 2 shows an example screen 110 that may be presented by the monitoring device 1016 in response to selection of one of the event windows 106 shown in FIG. 1. In the illustrated example, the screen 110 includes three video feed windows 112 configured to display streamed video from three different cameras 604 at the monitored location 602 corresponding to the selected event window 106. Although not illustrated in FIG. 2, controls may additionally or alternatively be provided to allow the monitoring agent 104 to listen to streamed audio from the corresponding camera(s) 604 as well as to speak into a microphone so as to cause one or more speakers of such camera(s) 604 to output audio representing to the monitoring agent's voice. In the illustrated example, the screen 110 also includes a larger, main viewer window 114 in which the streamed video for one of the video feed windows 112 may optionally be played, thus making it easier for the monitoring agent 104 to see the content of the video. In some implementations, the monitoring agent 104 may cause the streamed video from a particular camera 604 to be played in the main viewer window 114 by selecting the video feed window 112 for that camera, e.g., by clicking on it.

The monitoring agent 104 may take an appropriate action based on a review of the live video and/or audio from the camera(s) 604. If the monitoring agent 104 determines that a threat or other security issue may exist, the monitoring agent 104 may trigger an alarm, notify the police, verbally communicate with one or more individuals at the monitored location 602, e.g., via a speaker on a camera 604, and/or take any of a number of other possible remedial actions. If the monitoring agent 104 determines that no security issue exists, the monitoring agent 104 may instead mark the event notification as clear, thus causing it to be removed from that agent's queue.

Referring again to FIG. 1, the inventors have recognized and appreciated that distributing event notifications to the review queues of monitoring agents 104 in the manner described above may, if not properly controlled, necessitate the use of an excessively large number of monitoring agents 104 to review such event notifications in a timely manner. As noted above, a camera 604 of a security system 600 (see FIG. 6) may be triggered by a person (e.g., a delivery person, a lawn service person, a homeowner, a burglar, etc.) coming within the field of view (FOV) of the camera 604, and a video clip from the camera 604 may be associated with an event and added to the review queue of a monitoring agent 104, e.g., by presenting the video clip within one of the event windows 106 shown in FIG. 1. If the same person leaves and subsequently re-enters the FOV of the camera 604, the system may record another video clip, associate that video clip with another event, and distribute a notification of that additional event to a review queue of a monitoring agent 104. Further, if a monitored location 602 (see FIG. 6) has more than one camera 604, then different cameras 604 may be triggered by a single person moving about the monitored location 602, thus resulting in even further events being detected and notifications of those additional events also being distributed to review queues of monitoring agents 104.

The inventors have additionally recognized and appreciated that hardware-related problems can arise when multiple monitoring agents 104 attempt to establish live video feeds with the same camera 604 at the same time, such as cameras 604 slowing down or even crashing when such simultaneous live video feeds are attempted or established.

Some existing camera solutions use various techniques to reduce the number of event notifications that are generated for the same incident (e.g., a person moving about a monitored location 602). For example, some systems employ cameras that go into a "cool down" period after being triggered so that the camera does not trigger again for a short period of time even if a person is subsequently detected.

Systems employing such techniques, however, still tend to generate an unwieldy number of event notifications for the same incident.

To address the above-noted problems, in some implementations, the system disclosed herein may control the distribution of event notifications to monitoring agents, regardless of the number of event notifications that are generated (based on triggered cameras or otherwise), so as to minimize the number of human agents that are needed to competently review event notifications (and any associated images and/or audio) to ascertain whether individual event notifications raise actual security concerns or were instead generated for innocuous reasons, as well as to minimize the number of simultaneous peer-to-peer connections that are established with individual cameras 604.

Figure 3:
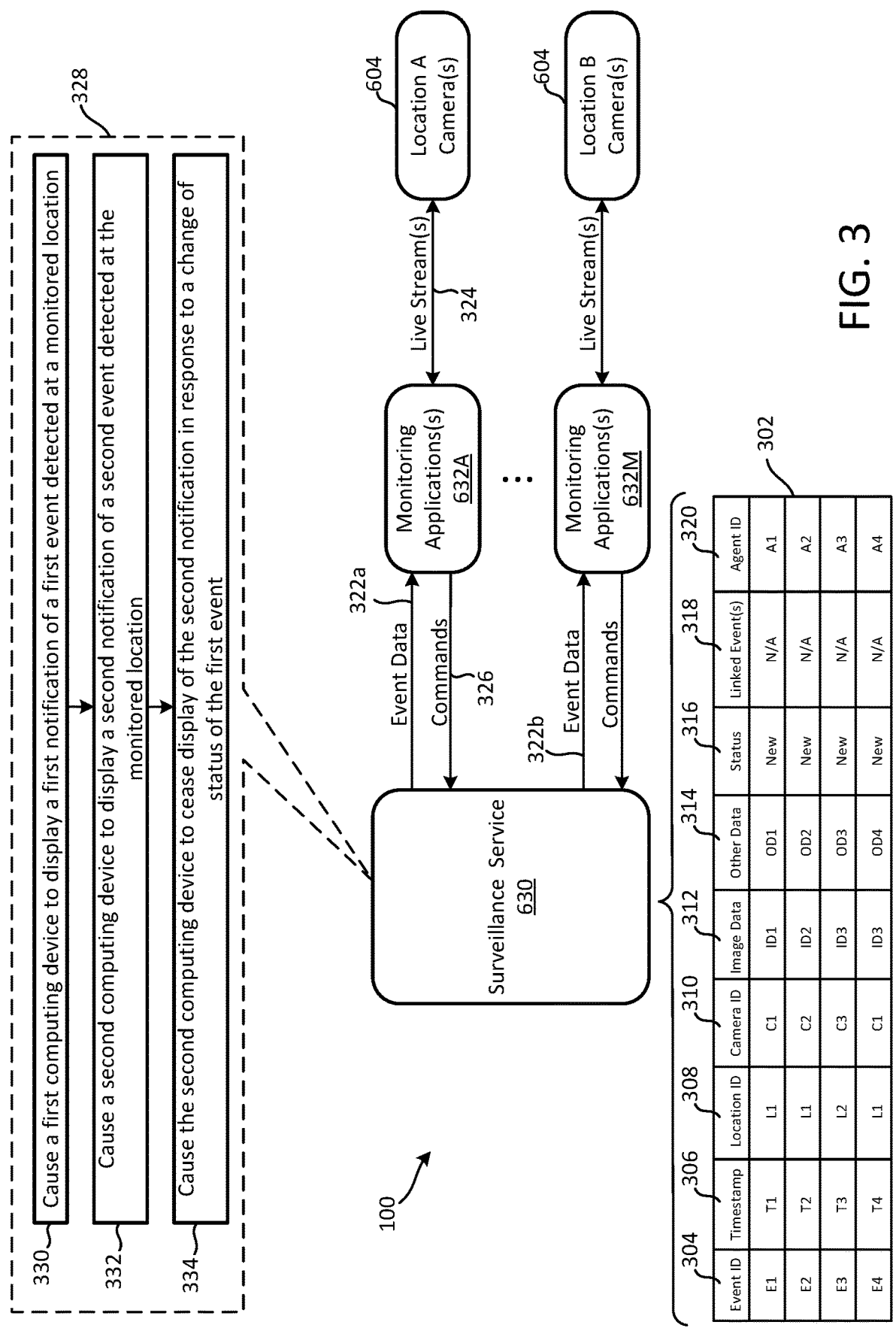
FIG. 3 shows example system configured to streamline the dispatching of notifications of events to monitoring applications for review by monitoring agents, according to some implementations of the present disclosure.

FIG. 3 shows an example system 100 in which a surveillance service 630 (described below in connection with FIGS. 6 and 10) may use a status table 302 or other data structure to streamline the dispatching of notifications of events to monitoring applications 632A through 632M (also described below in connection with FIGS. 6 and 10) for review by monitoring agents 104, according to some implementations of the present disclosure. As explained in further detail below in connection with FIG. 10, in some implementations, the surveillance service 630 may include, among other things, an event listening service 1010 and a monitoring service 1040, with the monitoring service 1040 maintaining records concerning events that are identified by the event listening service 1010. In such implementations, the status table 302 may be maintained, for example, by the monitoring service 1040. In some implementations, one or more components of the surveillance service 630 (e.g., the monitoring service 1040) may use the contents of the status table 302 to assign individual events to various monitoring agents 104 who are currently on-line with monitoring applications 632. The monitoring application 632 operated by a given monitoring agent 104 may then add the events assigned to that monitoring agent 104 to a queue of events, e.g., within the event windows 106 shown in FIG. 1, for review by that monitoring agent 104.

As shown in FIG. 3, in some implementations, the status table 302 may be populated with data representing event identifiers (IDs) 304, timestamps 306, location IDs 308, camera IDs 310, image data 312, other data 314, status indicators 316, linked event(s) 318, and agent IDs 320.

The event IDs 304 may represent the different events that the surveillance service 630 has detected, and the data in the same row as a given event ID 304 may correspond to that same event.

The timestamps 306 may indicate the date and time at which the corresponding event was detected.

The location IDs 308 may identify the monitored location 602 (see FIG. 6) at which the event was detected.

The camera IDs 310 may identify the cameras 604 that are associated with the corresponding detected events.

The image data 312 may represent one or more images (e.g., snapshots or video clips) that were acquired by the camera 604 identified by the corresponding camera IDs 310 when the event was detected.

Figure 10:
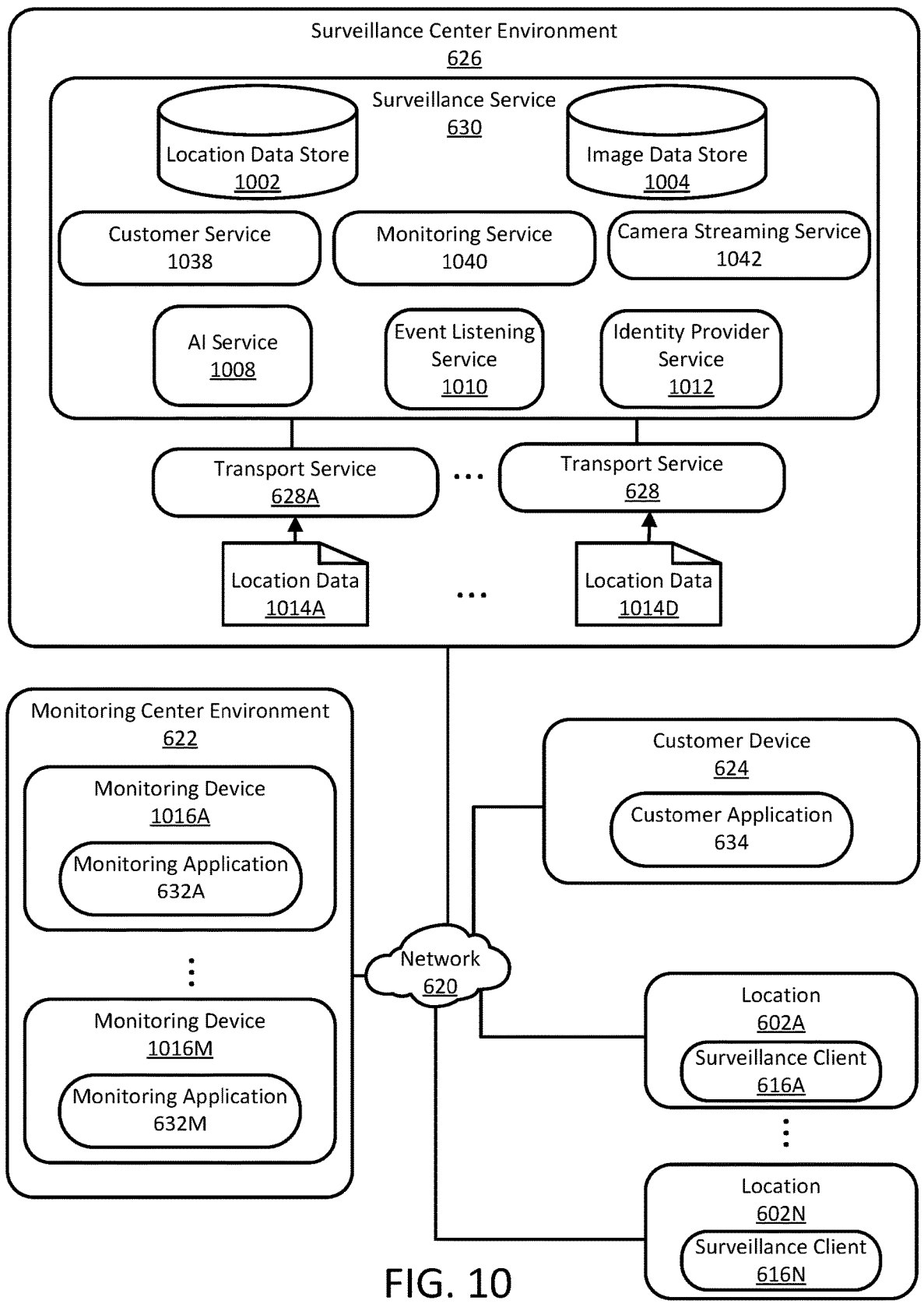
FIG. 10 shows example implementations of the surveillance center environment and the monitoring center environment of the security system shown in FIG. 6, according to some implementations of the present disclosure.

The other data 314 may represent any of a number of other types of potentially useful information associated with the event, such as a description of the event (e.g., "Back Yard Camera Detected Motion"), an alarm status for the monitored location 602, one or more recorded audio tracks associated with the event, indicators of detected motion during the event, indicators of detected faces corresponding to the event, a threat level assigned to the event (e.g., determined by the AI service 1008 described below in connection with FIG. 10), status changes of one or more sensors (e.g., door lock sensors) at a monitored location 602, etc. As described in more detail below in connection with FIG. 5, in some implementations, the other data 314 in the status table 302 may be used to populate one or more event data windows 502 that can be displayed by a monitoring device 1016, together with one or more live video feeds within the video feed window(s) 112 and/or the main viewer window 114.

The status indicator 316 may reflect the current status of the event. As shown in FIG. 3, when data for an event is initially written to the status table 302, the status indicator 316 for the event may be configured to indicate that the event has not yet been classified by a monitoring agent 104 as either raising a security concern or not raising such a concern. In the illustrated example, the "New" status indicators 316 identify such yet-to-be-classified events. As shown in FIGS. 4A and 4B, in some implementations, one or more of the status indicators 316 may be altered during operation of the system 100 to indicate (A) that a monitoring agent 104 is actively reviewing an event (e.g., via a "Reviewing" status indicator 316), (B) to indicate that an event is not to be included in any monitoring agent's review queue (e.g., via a "Hold" status indicator), (C) to indicate that a monitoring agent 104 has determined that an event does not raise a security concern (e.g., via a "Clear" status indicator 316), or (D) to indicate that a monitoring agent 104 has determined that the event raises a security concern (e.g., via a "Threat" status indicator 316). The manner in which such status indicators 316 can be used to streamline the dispatching of notifications of events to monitoring applications 632A through 632M (also described below in connection with FIGS. 6 and 10) for review by monitoring agents 104 is described in more detail below.

The linked event(s) indicators 318 may identify events that have been determined to be likely related to the same incident as an event that is being, or was previously, actively reviewed by a monitoring agent 104, e.g., by viewing live video feeds for the event. Example techniques that can be used to identify such likely related events and to use the linked event(s) indicators 318 to streamline the assignment of event notifications to monitoring agents 104 are described in detail below.

The agent IDs 320 may identify the monitoring agents 104, if any, to whom the events have been assigned for review. As shown in FIGS. 3, 4A, and 4B, in some implementations, the agent IDs 320 may indicate either that the corresponding event has been assigned to one or more monitoring agents 104 for review (e.g., by including an identifier of a particular monitoring agent 104), or that the events are not currently assigned to any monitoring agent 104 for review (e.g., by including an "Unassigned" designation).

As noted previously, in some implementations, when data for an event is initially written to the status table 302, the status indicator 316 for the event may be set to indicate that the event has not yet been classified by a monitoring agent 104 (e.g., via a "New" status indicator 316). In such implementations, one or more components of the surveillance service 630 (e.g., the monitoring service 1040 shown in FIG. 10) may monitor the status table 302 to identify events with a "New" status and assign such events to available monitoring agents 104. Such assignments can be made, for example, by adding agent IDs 320 of the agents to whom the events are assigned to the status table 302. The events that have a "New" status indicator 316 and that have an agent ID 320 in the status table 302 may be deemed to be in the review queues of the identified monitoring agents 104. As explained in more detail below, in some implementations, only events that occurred less than a threshold amount of time in the past (e.g., within the last thirty minutes) may be added to a monitoring agent's queue, thus preventing monitoring agents 104 from receiving notifications about events that have become stale (e.g., because whatever incident occurred is likely no longer occurring) and with respect to which the monitoring agent 104 would likely not be able to intervene in a meaningful way.

One or more components of the surveillance service 630 shown in FIG. 3 (e.g., the monitoring service 1040 described in connection with FIG. 10) may monitor the status indicators 316 and agent IDs 320 in the table to determine the events that are currently in the respective monitoring agent's review queues, and, as indicated by arrows 322a, 322b in FIG. 3, may send "event data" (e.g., the image data 312 and/or the other data 314) concerning those events to the monitoring applications 632 that are being operated by the indicated monitoring agents 104. As a result, the monitoring devices 1016 of the individual monitoring agents 104 may present information (e.g., video clips) about the events assigned to those monitoring agents 104 within respective event windows 106, such as illustrated in FIG. 1.

As an example, when the status table 302 is populated as shown in FIG. 3, the surveillance service 630 may determine: (1) that event "E1" is currently in the review queue of agent "A1," (2) that event "E2" is currently in the review queue of agent "A2," (3) that event "E3" is currently in the review queue of agent "A3," and (4) that event "E4" is currently in the review queue of agent "A4." The version of the status table 302 shown in FIG. 3 also indicates that the events "E1," "E2," and "E4" all occurred at one monitored location 602, i.e., location "L1," whereas the event "E3" occurred at a different monitored location 602, i.e., location "L2." Further, with respect to the events at the monitored location "L1," the version of table 302 shown in FIG. 3 additionally indicates that two of the events (i.e., events "E1" and "E4") were detected by one camera (i.e., camera "C1") and the other event (i.e., event "E2") was detected by another camera (i.e., camera "C2").

Continuing with the foregoing example, if monitoring agent "A1," upon reviewing the events in that monitoring agent's review queue, e.g., by viewing video clips presented in one or more event windows 106 (see FIG. 1), determines that event "E1" raises a potential security concern, the monitoring agent "A1" may provide an input to take exclusive responsibility for evaluating the incident to which the event "E1" relates, such as by reviewing one or more live video feeds from the monitored location "L1." In some implementations, for example, the monitoring agent "A1" may acquire exclusive custody of the incident by clicking on or otherwise selecting the event window 106 in which the video clip corresponding to the event "E1" is being played.

As described above, and as indicated by an arrow 324 in FIG. 3, providing such an input may cause the monitoring application 632 of the monitoring agent "E1" to establish peer-to-peer connections with one or more cameras 604 at the monitored location "L1" (e.g., cameras "C1" and "C2"), and to present live video feeds from those cameras 604 within one or more video feed windows 112 and/or a main viewer window 114 of that monitoring agent's monitoring device 1016. For example, as indicated by an arrow 326 in FIG. 3, providing such an input may cause the monitoring application 632 to send one or more commands to a component of the surveillance service 630 (e.g., the monitoring service 1040 shown in FIG. 10) for the purpose of establishing such peer-to-peer connections. An example process of establishing a peer-to-peer connection between a monitoring application 632 and a camera 604 is described below in connection with FIGS. 12 and 13, with the transmission of the camera access request and user token per the arrow 1202 in FIG. 12 corresponding to one or more of the commands indicated by the arrow 326 in FIG. 3.

As shown in the version of the status table 302 shown in FIG. 4A, upon processing such a request to acquire exclusive custody of an incident from the monitoring application 632 of the monitoring agent "A1," the surveillance service 630 may make several changes to the status indicators 316 for the various events detected at the monitored location "L1," i.e., the location from which the monitoring agent "A1" is now viewing live video feeds. As noted below, those changes may serve to group together various events that likely relate to the same incident (e.g., a person moving about the monitored location "L1") and allow a single monitoring agent, e.g., the monitoring agent "A1," to address all of those likely related events as a group.

As illustrated in FIG. 4A, one such change the surveillance service 630 may make to the status table 302 is to change the status indicator 316 for the event the monitoring agent "A1" selected, i.e., the event "E1," to indicate that event is currently under active review. In the illustrated example, the surveillance service 630 has set the status indicator 316 of the event "E1" to "Reviewing" for that purpose. In addition, the surveillance service 630 may identify one or more other events represented in the status table 302 that correspond to the same location as the under-review event "E1," i.e., location "L1," and may change the status indicators 316 for those events to indicate they are not to be included in any monitoring agent's review queue. In the illustrated example, surveillance service 630 has set the status indicators 316 of the events "E2" and "E4" to "Hold" for that purpose. In some implementations, in addition to identifying one or more events that correspond to the same location as the under-review event, e.g., the location "L1" of the event "E1," the surveillance service 630 may also determine whether such events meet one or more additional criteria relating to the under-review event, and may change the status indicators 316 to "Hold" only for the events that meet such criteria. In some implementations, for example, the surveillance service 630 may mark as "Hold" only those events detected at the location "L1" that have timestamps within a window of time keyed off the timestamp "T1" of the event "E1." Such a window of time may extend, for example, from a time five minutes prior to the time indicated by the timestamp "T1" to a time five minutes after the time indicated by the timestamp "T1." Further, in some implementations, whenever the surveillance service 630 adds a newly detected event to the status table 302, the surveillance service 630 may check to see whether that new event originated from the same monitored location 602 as any event that is currently under active review, e.g., by determining whether any events having the same location ID 308 have status indicators that have been set to "Reviewing," and may possibly also check to see whether such the newly added event meets the one or more additional criteria noted above, e.g., by determining whether the newly added event occurred within a time window keyed off the timestamp of an event from the same monitored location 602 that is under active review. When the surveillance service 630 determines that a newly added event originated from the same monitored location 602 as an existing event that is currently under active review and, if applicable, meets the one or more additional criteria, the surveillance service 630 may set the status indicator 316 for the newly added event to "Hold."

As also illustrated in FIG. 4A, for the events that are marked as "Hold," the surveillance service 630 may additionally change the agents ID 320 for those events to indicate they are not currently assigned to any monitoring agent 104 and/or may refrain from assigning those events to any monitoring agent 104 so long as the status indicators 316 for those events remain in the "Hold" state. In the illustrated example, the surveillance service 630 has set the agent IDs 320 of the events "E2" and "E4" to "Unassigned" for such purposes.

Significantly, when the surveillance service 630 makes such changes to the agent IDs 320, the corresponding events that were previously included in other monitoring agents' review queues may be removed from those queues. Accordingly, those other monitoring agents 104 may be relieved of the responsibility of reviewing those events, and room may be made in the review queues of those monitoring agents 104 to receive events from other monitored locations 602. Further, as noted previously, for so long as the status indicator 316 remains set to "Hold" for any event, the surveillance service 630 may not assign that event to any monitoring agent 104, thus preventing the review queues of the various monitoring agents 104 from being cluttered with events relating to incidents that are under active review by other monitoring agents 104. Grouping events in this manner can also provide a significant benefit from a hardware perspective, at least because it reduces the likelihood that multiple monitoring agents 104 will attempt to establish live feeds with cameras 604 at the same time, thus precluding potential problems (e.g., video signal delays, cameras crashing, etc.) that may occur when such simultaneous live camera feeds are attempted or established.

As noted previously, in response to a monitoring agent 104 providing an input selecting an event to actively review (e.g., by selecting one the event windows 106 shown in FIG. 1), peer-to-peer connections may be established between a monitoring application 632 of that monitoring agent 104 and one or more cameras 604 at the monitored location 602 at which the selected event occurred, and live video feeds from those cameras 604 may be presented within one or more video feed windows 112 and/or a main viewer window 114 of the monitoring agent's monitoring device 1016. As illustrated in FIG. 5, in some implementations, the data in the status table 302 may additionally or alternatively be used to present the monitoring agent 104 with other information concerning events (e.g., within event data windows 502 or otherwise) at the monitored location 602 that can potentially be used to determine whether the selected event relates to an actual security threat or can instead be "cleared."

In some implementations, the other data 314 in the same row as the selected event (e.g., event "E1," per the example scenario described above) of the types described above can be used to populate one or more of the event data windows 502 shown in FIG. 5, or may otherwise be used to present supplemental information on the screen 504. Such other data 314 may be sent from the surveillance service 630 to the monitoring application 632, e.g., as additional "event data" per the arrow 322a in FIG. 3. As one example, the other data 314 may represent a description of the event that is under active review (e.g., "Back Yard Camera Detected Motion"), an alarm status for the monitored location 602, and/or a threat level assigned to the event (e.g., by the AI service 1008 described below in connection with FIG. 10), and the monitoring application 632 may use that other data 314 to cause text reflecting such information, or other indicators, to be presented prominently on the screen 504, e.g., directly below the video feed windows 112. As another example, the other data 314 may represent or more recorded audio tracks associated with the event that is under active review, indicators of detected motion during the event that is under active review, and/or indicators of detected faces corresponding to the event that is under active review. Such information may likewise be presented within one or more of the event data windows 502 or elsewhere on the screen 504.

Further, in some implementations, image data 312 and/or other data 314 data in rows other than the row of the selected event (e.g., data for the events that have been marked as "Hold" in the status table 302 because they are from the same monitored location 602 as the selected event) can be used to populate one or more of the event data windows 502 shown in FIG. 5, or may otherwise be used to present supplemental information on the screen 504. Such data may likewise be sent from the surveillance service 630 to the monitoring application 632, e.g., as additional "event data" per the arrow 322a in FIG. 3. As one example, the monitoring application 632 may cause the monitoring device 1016 of the monitoring agent 104 to present the image data 312 (e.g., video clips) for events that were marked as "Hold" in the status table 302 (e.g., because they are from the same monitored location 602 as the selected event) within respective event data windows 502 of the screen 504. Providing such image data 312 for events that have been grouped with the selected event, together with the live video streams from the monitored location 602, may allow the reviewing monitoring agent 104 to ascertain the context in which the selected event occurred, such as by presenting video clips for events that occurred before or after the selected event.

As another example, the monitoring application 632 may additionally or alternatively use the other data 314 for events that were marked as "Hold" in the status table 302 (e.g., because they are from the same monitored location 602 as the selected event) to populate and/or annotate one or more of the event data windows 502 shown in FIG. 5, or to otherwise present supplemental information on the screen 504, such as by providing a textual description of the other events (e.g., "Living Room Camera Detected Motion") and/or threat levels assigned to such events (e.g., determined by the AI service 1008 described below in connection with FIG. 10), by presenting a user interface to review one more recorded audio tracks associated with such events, by presenting indicators of detected motion during such events, and/or by presenting indicators of detected faces corresponding to such events. Further, in some implementations, the monitoring application 632 may additionally or alternatively use the other data 314 for events that were marked as "Hold" in the status table 302 (e.g., because they are from the same monitored location 602 as the selected event) to generate and display a list of events in a chronological order, e.g., as a timeline.

As shown in FIG. 5, in some implementations, the monitoring application 632 may cause the screen 504 of the monitoring device 1016 to present a scroll bar 506 that a monitoring agent 104 can manipulate, e.g., to access and review additional event data windows 502 than cannot fit within the display region of the monitoring device 1016.

Upon being presented with the screen 504 and reviewing live video feeds and/or other information relating to the selected event, the monitoring agent 104 may (A) provide an input indicating that the selected event does not present a security threat, thus causing the surveillance service 630 to set the status indicator 316 for the selected event to "Clear," (B) provide an input indicating that the selected event does present a security threat, thus causing the surveillance service 630 to set the status indicator 316 for the selected event to a "Threat," or (C) cease reviewing the event, for any of a number of reasons, thus causing the surveillance service 630 to again set the status indicator 316 for the selected event to "New." Indicators of such inputs/actions taken by the monitoring agent 104 with respect to the monitoring application 632 may be sent from the monitoring application 632 to the surveillance service 630, e.g., as one or more of the commands indicated by the arrow 326 in FIG. 3. In some implementations, no matter what action the monitoring agent 104 takes, the resulting change to the status indicator 316 for the selected event may also be applied to the status indicators 316 for the other events that were previously changed to "Hold" upon selection of the event. In the example shown in FIG. 4A, for instance, if the monitoring agent "A1" ceases to actively review the event "E1," the surveillance service 630 may change the status indicators 316 for the events "E1," "E2," and "E4" to "New." Similarly, as illustrated in FIG. 4B, if the monitoring agent "A1" provides an input indicating that the event "E1" does not relate to an actual security threat, the surveillance service 630 may change the status indicators 316 for the events "E1," "E2," and "E4" to "Clear." As yet another example, and as also illustrated in FIG. 4B, if the monitoring agent "A3" provides an input indicating that the event "E3" does relate to an actual security threat, the surveillance service 630 may change the status indicator 316 for the event "E3" to "Threat."

Accordingly, the surveillance service 630 enables the grouping of events based on location and/or time considerations, and multiple events can be reviewed and classified, by a single monitoring agent 104, as a group. Such a configuration can thus significantly reduce the number of human monitoring agents 104 that are needed to effectively review and classify events that are distributed to them for review, and can also minimize the number of simultaneous peer-to-peer connections that are established with individual cameras 604.

Referring again to FIG. 3, an example routine 328 that may be performed by one or more components of the surveillance service 630 (e.g., the monitoring service 1040 shown in FIG. 10), in accordance with some embodiments of the present disclosure, is additionally shown. As shown in FIG. 3, the routine 328 may begin at a step 330, at which the surveillance service 630 may cause a first computing device (e.g., a monitoring device 1016 shown in FIG. 1) to display a first notification of a first event (e.g., the event "E1" reflected in the status table 302) detected at a monitored location (e.g., the location "L1"). In some implementations, for example, the surveillance service 630 may send event data to the monitoring device 1016 operated by monitoring agent "A1" to cause that device to display a video clip of the event "E1" within an event window 106 of a screen 102.

At a step 332 of the routine 328, the surveillance service 630 may cause a second computing device (e.g., another monitoring device 1016) to display a second notification of a second event (e.g., the event "E2" reflected in the status table 302) detected at the monitored location (e.g., the location "L1"). In some implementations, for example, the surveillance service 630 may send event data to the other monitoring device 1016 operated by the monitoring agent "A2" to cause that device to display a video clip of the event "E2" within an event window 106 of a screen 102).

At a step 334 of the routine 328, the surveillance service 630 may cause the second computing device (e.g., the monitoring device 1016 operated by the monitoring agent "A2") to cease display of the second notification in response to a change of status of the first event. For example, with reference to FIG. 4A, in some implementations, in response to the surveillance service 630 determining that a status indicator 316 for the event "E1" has been set to a value (e.g., "Reviewing") that indicates the event is being actively reviewed by the monitoring agent "A1," the surveillance service 630 may change the agent ID 320 for the event "E2" in the status table 302 to a value (e.g., "Unassigned") indicating that event is no longer assigned to the monitoring agent "A2," thus freeing the monitoring agent "A2" from responsibility for reviewing the event "E2."

Additional example routines 1400, 1410, 1420, 1440, 1460, 1470, 1480, 1500, and 1600 that may be performed by one or more components of the surveillance service 630 (e.g., the monitoring service 1040 shown in FIG. 10) to implement various aspects of the functionality described herein are also described below in connection with FIGS. 14A, 14B, 14C, 14D, 14E, 14F, 14G, 15, and 15, respectively.

Figure 6:
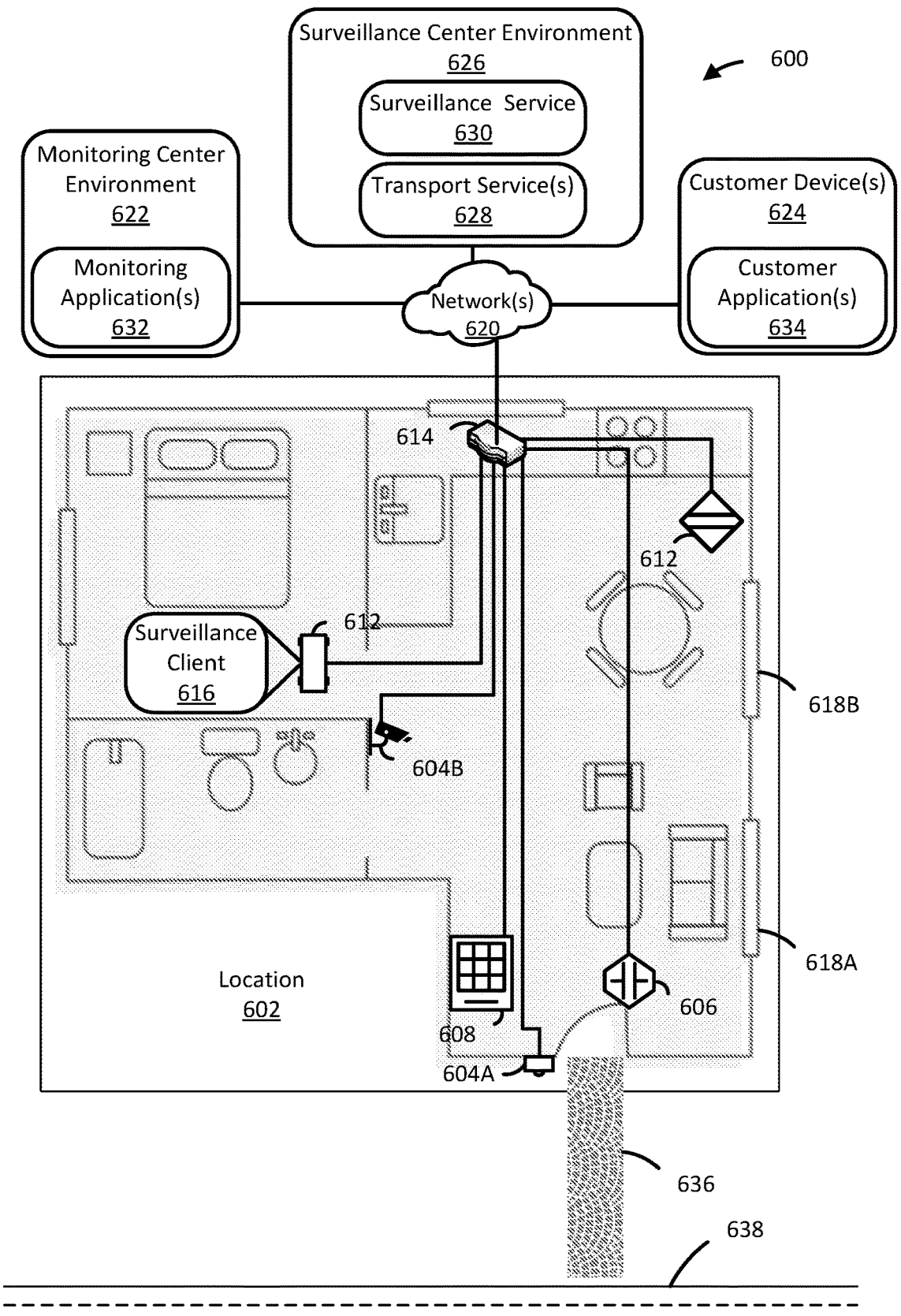
FIG. 6 shows an example implementation of a security system, according to some implementations of the present disclosure.

FIG. 6 is a schematic diagram of an example security system 600 with which various aspects of the present disclosure may be employed. As shown, in some implementations, the security system 600 may include a plurality of monitored locations 602 (only one of which is illustrated in FIG. 6), a monitoring center environment 622, a surveillance center environment 626, one or more customer devices 624, and one or more communication networks 620. The monitored location 602, the monitoring center environment 622, the surveillance center environment 626, the one or more customer device(s) 624, and the communication network(s) 620 may each include one or more computing devices (e.g., as described below with reference to FIG. 17). The customer device(s) 624 may include one or more customer applications 634, e.g., as applications hosted on or otherwise accessible by the customer device(s) 624. In some implementations, the customer applications 634 may be embodied as web applications that can be accessed via browsers of the customer device(s) 624. The monitoring center environment 622 may include one or more monitoring applications 632, e.g., as applications hosted on or otherwise accessible to computing devices within the monitoring center environment 622. In some implementations, the monitoring applications 632 may be embodied as web applications that can be accessed via browsers of computing devices operated by monitoring agents 104 within the monitoring center environment 622. The surveillance center environment 626 may include a surveillance service 630 and one or more transport services 628.

As shown in FIG. 6, the monitored location 602 may include one or more image capture devices (e.g., cameras 604A and 604B), one or more contact sensor assemblies (e.g., contact sensor assembly 606), one or more keypads (e.g., keypad 608), one or more motion sensor assemblies (e.g., motion sensor assembly 610), a base station 612, and a router 614. As illustrated, the base station 612 may host a surveillance client 616.

In some implementations, the router 614 may be a wireless router that is configured to communicate with the devices disposed at the monitored location 602 (e.g., devices 604A, 604B, 606, 608, 610, and 612) via communications that comport with a communications standard such as any of the various Institute of Electrical and Electronics Engineers (IEEE) 108.11 standards. As illustrated in FIG. 6, the router

614 may also be configured to communicate with the network(s) 620. In some implementations, the router 614 may implement a local area network (LAN) within and proximate to the monitored location 602. In other implementations, other types of networking technologies may additionally or alternatively be used within the monitored location 602. For instance, in some implementations, the base station 612 may receive and forward communication packets transmitted by one or both of the cameras 604A, 604B via a point-to-point personal area network (PAN) protocol, such as BLUETOOTH. Other suitable wired, wireless, and mesh network technologies and topologies will be apparent with the benefit of this disclosure and are intended to fall within the scope of the examples disclosed herein.

The network(s) 620 may include one or more public and/or private networks that support, for example, internet protocol (IP) communications. The network(s) 620 may include, for example, one or more LANs, one or more PANs, and/or one or more wide area networks (WANs). LANs that may be employed include wired or wireless networks that support various LAN standards, such as a version of IEEE 108.11 or the like. PANs that may be employed include wired or wireless networks that support various PAN standards, such as BLUETOOTH, ZIGBEE, or the like. WANs that may be employed include wired or wireless networks that support various WAN standards, such as Code Division Multiple Access (CMDA), Global System for Mobiles (GSM), or the like. Regardless of the particular networking technology that is employed, the network(s) 620 may connect and enable data communication among the components within the monitored location 602, the monitoring center environment 622, the surveillance center environment 626, and the customer device(s) 624. In at least some implementations, both the monitoring center environment 622 and the surveillance center environment 626 may include networking components (e.g., similar to the router 614) that are configured to communicate with the network(s) 620 and various computing devices within those environments.

The surveillance center environment 626 may include physical space, communications, cooling, and power infrastructure to support networked operation of a large number of computing devices. For instance, the infrastructure of the surveillance center environment 626 may include rack space into which the computing devices may be installed, uninterruptible power supplies, cooling plenum and equipment, and networking devices. The surveillance center environment 626 may be dedicated to the security system 600, may be a non-dedicated, commercially available cloud computing service (e.g., MICROSOFT AZURE, AMAZON WEB SERVICES, GOOGLE CLOUD, or the like), or may include a hybrid configuration made up of both dedicated and non-dedicated resources. Regardless of its physical or logical configuration, as shown in FIG. 6, the surveillance center environment 626 may be configured to host the surveillance service 630 and the transport service(s) 628.

The monitoring center environment 622 may include a plurality of computing devices (e.g., desktop computers) and network equipment (e.g., one or more routers) that enable communication between the computing devices and the network(s) 620. The customer device(s) 624 may each include a personal computing device (e.g., a desktop computer, laptop, tablet, smartphone, or the like) and network equipment (e.g., a router, cellular modem, cellular radio, or the like). As illustrated in FIG. 6, the monitoring center environment 622 may be configured to host the monitoring application(s) 632 and the customer device(s) 624 may be configured to host the customer application(s) 634.

The devices 604A, 604B, 606, and 610 may be configured to acquire analog signals via sensors incorporated into the devices, generate digital sensor data based on the acquired signals, and communicate (e.g., via a wireless link with the router 614) the sensor data to the base station 612. The types of sensor data generated and communicated by these devices may vary depending on the characteristics of the sensors they include. For instance, the image capture devices or cameras 604A and 604B may acquire ambient light, generate one or more frames of image data based on the acquired light, and communicate the frame(s) to the base station 612, although the pixel resolution and frame rate may vary depending on the capabilities of the devices. In some implementations, the cameras 604A and 604B may also receive and store filter zone configuration data and filter the frame(s) using one or more filter zones (e.g., areas within the FOV of a camera from which image data is to be redacted for various reasons, such as to exclude a tree that is likely to generate a false positive motion detection result on a windy day) prior to communicating the frame(s) to the base station 612. In the example shown in FIG. 6, the camera 604A has a field of view (FOV) that originates proximal to a front door of the monitored location 602 and can acquire images of a walkway 636, a road 638, and a space between the monitored location 602 and the road 64A0. The camera 604B, on the other hand, has an FOV that originates proximal to a bathroom of the monitored location 602 and can acquire images of a living room and dining area of the monitored location 602. The camera 604B may further acquire images of outdoor areas beyond the monitored location 602, e.g., through windows 618A and 618B on the right-hand side of the monitored location 602.

Individual sensor assemblies deployed at the monitored location 602, e.g., the contact sensor assembly 606 shown in FIG. 6, may include, for example, a sensor that can detect the presence of a magnetic field generated by a magnet when the magnet is proximal to the sensor. When the magnetic field is present, the contact sensor assembly 606 may generate Boolean sensor data specifying a closed state of a window, door, etc. When the magnetic field is absent, the contact sensor assembly 606 may instead generate Boolean sensor data specifying an open state of the window, door, etc. In either case, the contact sensor assembly 606 shown in FIG. 6 may communicate sensor data indicating whether the front door of the monitored location 602 is open or closed to the base station 612.

Individual motion sensor assemblies that are deployed at the monitored location 602, e.g., the motion sensor assembly 610 shown in FIG. 6, may include, for example, a component that can emit high-frequency pressure waves (e.g., ultrasonic waves) and a sensor that can acquire reflections of the emitted waves. When the sensor detects a change in the reflected pressure waves, e.g., because one or more objects are moving within the space monitored by the sensor, the motion sensor assembly 610 may generate Boolean sensor data specifying an alert state. When the sensor does not detect a change in the reflected pressure waves, e.g., because no objects are moving within the monitored space, the motion sensor assembly 610 may instead generate Boolean sensor data specifying a still state. In either case, the motion sensor assembly 610 may communicate the sensor data to the base station 612. It should be noted that the specific sensing modalities described above are not limiting to the present disclosure. For instance, as but one example of an alternative implementation, the motion sensor assembly 610 may instead (or additionally) base its operation on the detection of changes in reflected electromagnetic waves.

While particular types sensors are described above, it should be appreciated that other types of sensors may additionally or alternatively be employed within the monitored location 602 to detect the presence and/or movement of humans, or other conditions of interest, such as smoke, elevated carbon dioxide levels, water accumulation, etc., and to communicate data indicative of such conditions to the base station 612. For instance, although not illustrated in FIG. 6, in some implementations, one or more sensors may be employed to detect sudden changes in a measured temperature, sudden changes in incident infrared radiation, sudden changes in incident pressure waves (e.g., sound waves), etc. Still further, in some implementations, some such sensors and/or the base station 612 may additionally or alternatively be configured to identify particular signal profiles indicative of particular conditions, such as sound profiles indicative of breaking glass, footsteps, coughing, etc.

The keypad 608 shown in FIG. 6 may be configured to interact with a user and interoperate with the other devices disposed in the monitored location 602 in response to such interactions. For instance, in some examples, the keypad 608 may be configured to receive input from a user that specifies one or more commands and to communicate the specified commands to one or more addressed devices and/or processes, e.g., one or more of the devices disposed in the monitored location 602, the monitoring application(s) 632, and/or the surveillance service 630. The communicated commands may include, for example, codes that authenticate the user as a resident of the monitored location 602 and/or codes that request activation or deactivation of one or more of the devices disposed in the monitored location 602. In some implementations, the keypad 608 may include a user interface (e.g., a tactile interface, such as a set of physical buttons or a set of "soft" buttons on a touchscreen) configured to interact with a user (e.g., receive input from and/or render output to the user). Further, in some implementations, the keypad 608 may receive responses to the communicated commands and render such responses via the user interface as visual or audio output.

The base station 612 shown in FIG. 6 may be configured to interoperate with other security system devices disposed at the monitored location 602 to provide local command and control and/or store-and-forward functionality via execution of the surveillance client 616. To implement local command and control functionality, the base station 612 may execute a variety of programmatic operations through execution of the surveillance client 616 in response to various events. Examples of such events include reception of commands from the keypad 608, reception of commands from one of the monitoring application(s) 632 or the customer application 634 via the network(s) 620, and detection of the occurrence of a scheduled event. The programmatic operations executed by the base station 612 via execution of the surveillance client 616 in response to events may include, for example, activation or deactivation of one or more of the devices 604A, 604B, 606, 608, and 610; sounding of an alarm; reporting an event to the surveillance service 630; and/or communicating "location data" to one or more of the transport service(s) 628. Such location data may include, for example, data specifying sensor readings (sensor data), image data acquired by one or more cameras 604, configuration data of one or more of the devices disposed at the monitored location 602, commands input and received from a user (e.g., via the keypad 608 or a customer application 634), or data derived from one or more of the foregoing data types (e.g., filtered sensor data, filtered image data, summarizations of sensor data, event data specifying an event detected at the monitored location 602 via the sensor data, etc.).

In some implementations, to implement store-and-forward functionality, the base station 612, through execution of the surveillance client 616, may receive sensor data, package the data for transport, and store the packaged sensor data in local memory for subsequent communication. Such communication of the packaged sensor data may include, for example, transmission of the packaged sensor data as a payload of a message to one or more of the transport service(s) 628 when a communication link to the transport service(s) 628 via the network(s) 620 is operational. In some implementations, such packaging of the sensor data may include filtering the sensor data using one or more filter zones and/or generating one or more summaries (maximum values, average values, changes in values since the previous communication of the same, etc.) of multiple sensor readings.

The transport service(s) 628 of the surveillance center environment 626 may be configured to receive messages from monitored locations (e.g., the monitored location 602), parse the messages to extract payloads included therein, and store the payloads and/or data derived from the payloads within one or more data stores hosted in the surveillance center environment 626. Examples of such data stores are described below in connection with FIG. 10. In some implementations, the transport service(s) 628 may expose and implement one or more application programming interfaces (APIs) that are configured to receive, process, and respond to calls from base stations (e.g., the base station 612) via the network(s) 620. Individual instances of transport service(s) 628 may be associated with and specific to certain manufactures and/or models of location-based monitoring equipment (e.g., SIMPLISAFE equipment, RING equipment, etc.).

The API(s) of the transport service(s) 628 may be implemented using a variety of architectural styles and interoperability standards. For instance, in some implementations, one or more such APIs may include a web services interface implemented using a representational state transfer (REST) architectural style. In such implementations, API calls may be encoded using the Hypertext Transfer Protocol (HTTP) along with JavaScript Object Notation (JSON) and/or an extensible markup language. Such API calls may be addressed to one or more uniform resource locators (URLs) corresponding to API endpoints monitored by the transport service(s) 628. In some implementations, portions of the HTTP communications may be encrypted to increase security. Alternatively (or additionally), in some implementations, one or more APIs of the transport service(s) 628 may be implemented as a .NET web API that responds to HTTP posts to particular URLs. Alternatively (or additionally), in some implementations, one or more APIs of the transport service(s) 628 may be implemented using simple file transfer protocol commands. Thus, the API(s) of the transport service(s) 628 are not limited to any particular implementation.

The surveillance service 630 within the surveillance center environment 626 may be configured to control the overall logical setup and operation of the security system 600. As such, the surveillance service 630 may communicate and interoperate with the transport service(s) 628, the monitoring application(s) 632, the customer application(s) 634, and the various devices disposed at the monitored location 602 via the network(s) 620. In some implementations, the surveillance service 630 may be configured to monitor data from a variety of sources for events (e.g., a break-in event) and, when an event is detected, notify one or more of the monitoring applications 632 and/or the customer application(s) 634 of the event.

In some implementations, the surveillance service 630 may additionally be configured to maintain state information regarding the monitored location 602. Such state information may indicate, for example, whether the monitored location 602 is safe or under threat. In some implementations, the surveillance service 630 may be configured to change the state information to indicate that the monitored location 602 is safe only upon receipt of a communication indicating a clear event (e.g., rather than making such a change solely due to the lack of additional events being detected). This feature can prevent a "crash and smash" robbery (e.g., where an intruder promptly destroys or disables monitoring equipment) from being successfully executed. In addition, in some implementations, the surveillance service 630 may be configured to monitor one or more particular zones within the monitored location 602, such as one or more particular rooms or other distinct regions within and/or around the monitored location 602 and/or one or more defined regions within the FOVs of the respective image capture devices deployed in the monitored location (e.g., the cameras 604A and 604B shown in FIG. 6).

The individual monitoring application(s) 632 of the monitoring center environment 622 may be configured to enable monitoring personnel to interact with respective computing devices to provide monitoring services for respective locations (e.g., the monitored location 602), and to execute a variety of programmatic operations in response to such interactions. For example, in some implementations, a monitoring application 632 may control its host computing device to provide information regarding events detected at monitored locations, such as the monitored location 602, to a person operating that computing device. Such events may include, for example, detected movement within a particular zone of the monitored location 602. As described above in connection with FIGS. 1 and 2, in some implementations, the monitoring application 632 may cause a monitoring device 1016 to present video clips of events within individual event windows 106 of a screen 102, and may further establish a streaming connection with one or more cameras 604 at the monitored location and cause the monitoring device 1016 to provide streamed video from such camera(s) 604 within the video feed windows 112 and/or a main viewer window 114 of a screen 110, as well as to allow audio communication between the monitoring device 1016 and the camera(s) 604.

The customer application(s) 634 of the customer device(s) 624 may be configured to enable customers to interact with their computing devices (e.g., their smartphones or personal computers) to access various services provided by the security system 600 for their individual homes or other locations (e.g., the monitored location 602), and to execute a variety of programmatic operations in response to such interactions. For example, in some implementations, a customer application 634 may control a customer device 624 (e.g., a smartphone or personal computer) to provide information regarding events detected at monitored locations, such as the monitored location 602, to the customer operating that customer device 624. Such events may include, for example, detected movement within a particular zone of the monitored location 602. In some implementations, the customer application 634 may additionally or alternatively be configured to process input received from the customer to activate or deactivate one or more of the devices disposed within the monitored location 602. Further, as described above in connection with FIG. 3, the customer application 634 may additionally or alternatively be configured to establish a streaming connection with one or more cameras 604 at the monitored location and cause the customer device 624 to display streamed video from such camera(s) 604, as well as to allow audio communication between the customer device 624 and the camera(s) 604.

Figure 7:
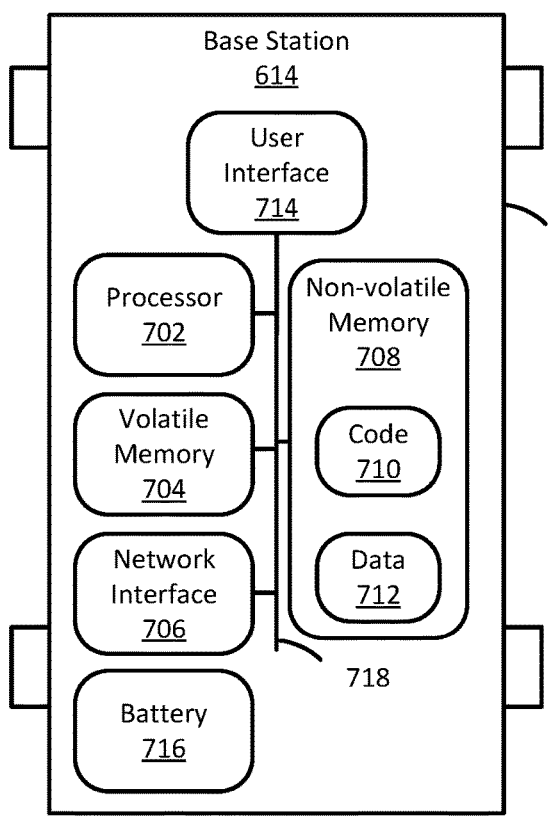
FIG. 7 shows an example implementation of the base station of the security system shown in FIG. 6, according to some implementations of the present disclosure.

Turning now to FIG. 7, an example base station 612 is schematically illustrated. As shown in FIG. 7, the base station 612 may include at least one processor 702, volatile memory 704, non-volatile memory 708, at least one network interface 706, a user interface 714, a battery assembly 716, and an interconnection mechanism 718. The non-volatile memory 708 may store executable code 710 and, as illustrated, may also include a data store 712. In some implementations, the features of the base station 612 enumerated above may be incorporated within, or may otherwise be supported by, a housing 720. In some implementations, the user interface 714 of the base station 612 may include only one or more speakers to provide audio output to a user concerning operational state changes of the security system 600, detected threats, etc., and/or one or more visual indicators (e.g., light emitting diode (LED) indicators) to indicate when the base station 612 is operational, responding to a user input (e.g., via the keypad 608), etc. In other implementations, the user interface may additionally or alternatively include a more complex output component (e.g., a display screen) and/or may include one or more user input components, such as one or more microphones (e.g., to receive voice commands) and/or a keypad (e.g., to receive tactile input).

In some implementations, the non-volatile (non-transitory) memory 708 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In some implementations, the code 710 stored in the non-volatile memory may include an operating system and one or more applications or programs that are configured to execute under the control of the operating system. In some implementations, the code 710 may additionally or alternatively include specialized firmware and embedded software that is executable without dependence upon a commercially available operating system. In any event, regardless how the code 710 is embodied, execution of the code 710 may implement the surveillance client 616 shown in FIG. 6 and enable the storage and manipulation of data for the surveillance client 616 within the data store 712.

The processor 702 of the base station 612 may include one or more processors configured to execute instructions encoded within a computer-readable medium, such as a computer program embodied by the code 710, to control the operations of the base station 612. As used herein, the term "processor" describes circuitry that executes a function, an operation, or a sequence of operations. The function, operation, or sequence of operations may be hard coded into the circuitry or soft coded by way of instructions held in a memory device (e.g., the volatile memory 704) and executed by the circuitry. In some implementations, the processor 702 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), and/or multicore processors.

Prior to executing the code 710, the processor 702 may copy at least a portion of the code 710 from the non-volatile memory 708 to the volatile memory 704. In some implementations, the volatile memory 704 may include one or more static or dynamic random access memory (RAM) chips and/or cache memory (e.g., memory disposed on a silicon die of the processor 702). Volatile memory 704 may offer a faster response time than a main memory, such as the non-volatile memory 708.

Through execution of the code 710, the processor 702 may control operation of the network interface 706. For instance, in some implementations, the network interface 706 may include one or more physical interfaces (e.g., a radio, an ethernet port, a universal serial bus (USB) port, etc.) as well as a software stack including drivers and/or other code 710 that is configured to communicate with the one or more physical interfaces to support one or more LAN, PAN, and/or WAN standard communication protocols. Such communication protocols may include, for example, transmission control protocol (TCP) and user datagram protocol (UDP) among others. As such, the network interface 706 may enable the base station 612 to access and communicate with other computing devices (e.g., the other devices disposed in the monitored location 602 of FIG. 6) via a computer network (e.g., the LAN established by the router 614 of FIG. 6, the network(s) 620 of FIG. 6, and/or a point-to-point connection). For instance, in some implementations, the network interface 706 may utilize sub-GHz wireless networking to transmit wake messages to the other computing devices to request streams of sensor data.

Through execution of the code 710, the processor 702 may additionally control operation of hardware and a software stack including drivers and/or other code 710 that is configured to communicate with other system devices. As such, the base station 612 may interact with other system components in response to received inputs. Such inputs may specify, for example, values that are to be stored in the data store 712. The base station 612 may further provide outputs representing values stored in the data store 712. In some implementations, the base station 612 may additionally include one or more light-emitting diodes (LEDs) or other visual indicators to visually communication information, such as system status or alarm events. Further, in some implementations, the base station 612 may additionally or alternatively include a siren (e.g., a 95 decibel (dB) siren) or other audio output device that may be controlled by the processor 702 to output an audio indication that a break-in event has been detected.

The various components of the base station 612 described above may communicate with one another via the interconnection mechanism 718. In some implementations, the interconnection mechanism 718 may include a communications bus. Further, in some implementations, the battery assembly 716 may be configured to supply operational power to the various features of the base station 612 described above. In some implementations, the battery assembly 716 may include at least one rechargeable battery (e.g., one or more nickel metal hydride (NiMH) or lithium batteries). In some implementations, such a rechargeable battery (or batteries) may have a runtime capacity sufficient to operate the base station 612 for twenty-four hours or longer while the base station 612 is disconnected from or otherwise not receiving line power. In some implementations, the battery assembly 716 may additionally or alternatively include power supply circuitry to receive, condition, and distribute line power to operate the base station 612 and/or to recharge one or more rechargeable batteries. Such power supply circuitry may include, for example, a transformer and a rectifier, among other circuitry, to convert AC line power to DC device and/or recharging power.

Figure 8:
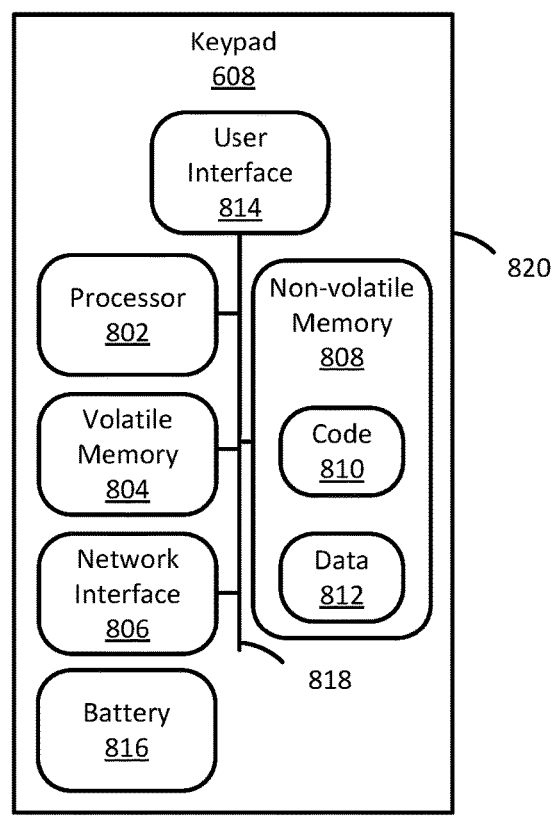
FIG. 8 shows an example implementation of the keypad of the security system shown in FIG. 6, according to some implementations of the present disclosure.

Turning now to FIG. 8, an example keypad 608 is schematically illustrated. As shown in FIG. 8, the keypad 608 may include at least one processor 802, volatile memory 804, non-volatile memory 808, at least one network interface 806, a user interface 814, a battery assembly 816, and an interconnection mechanism 818. The non-volatile memory 808 may store executable code 810 and, as illustrated, may also include a data store 812. In some implementations, the features of the keypad 608 enumerated above may be incorporated within, or may otherwise be supported by, a housing 820.

In some implementations, the respective descriptions of the processor 702, the volatile memory 704, the non-volatile memory 708, the interconnection mechanism 718, and the battery assembly 716 with reference to the base station 612 are applicable to the processor 802, the volatile memory 804, the non-volatile memory 808, the interconnection mechanism 818, and the battery assembly 816 with reference to the keypad 608. As such, those descriptions will not be repeated here.

Through execution of the code 810, the processor 802 of the keypad 608 may control operation of the network interface 806. In some implementations, the network interface 806 may include one or more physical interfaces (e.g., a radio, an ethernet port, a USB port, etc.) and a software stack including drivers and/or other code 810 that is configured to communicate with the one or more physical interfaces to support one or more LAN, PAN, and/or WAN standard communication protocols. Such communication protocols may include, for example, TCP and UDP, among others. As such, the network interface 806 may enable the keypad 608 to access and communicate with other computing devices (e.g., the other devices disposed in the monitored location 602 of FIG. 6) via a computer network (e.g., the LAN established by the router 614).

Through execution of the code 810, the processor 802 may additionally control operation of the user interface 814. In some implementations, the user interface 814 may include user input and/or output devices (e.g., physical keys arranged as a keypad, a touchscreen, a display, a speaker, a camera, a biometric scanner, an environmental sensor, etc.) and a software stack including drivers and/or other code 810 that is configured to communicate with the user input and/or output devices. As such, the user interface 814 may enable the keypad 608 to interact with users to receive inputs and/or render outputs. Examples of outputs that may be rendered by the user interface 814 include one or more GUIs comprising one or more controls configured to display outputs and/or receive inputs. The inputs received by the user interface 814 may specify, for example, values that are to be stored in the data store 812. The outputs provided by the user interface 814 may further indicate values stored in the data store 812. In some implementations, parts of the user interface 814 (e.g., one or more LEDs) may be accessible and/or visible as part of, or through, the housing 820.

Figure 9:
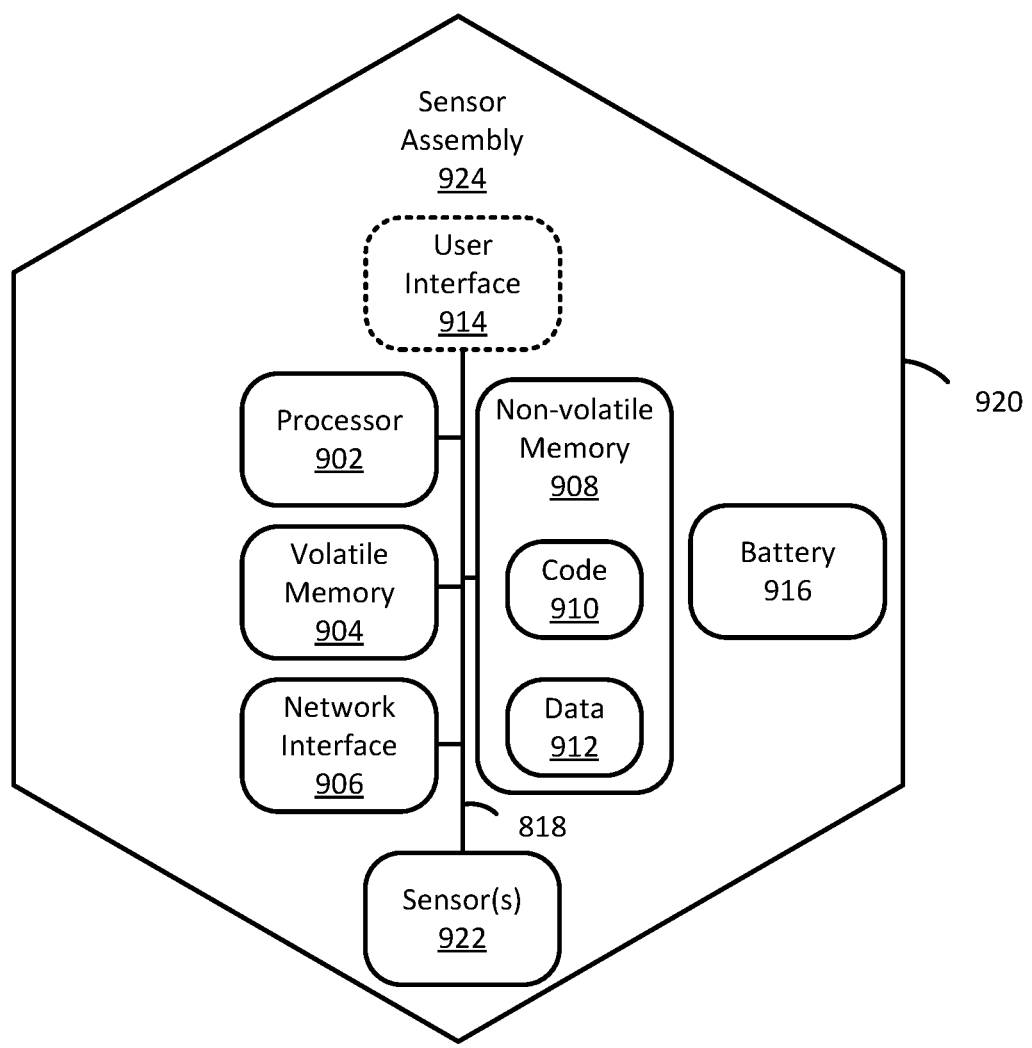
FIG. 9 shows an example implementation of a security sensor of the security system shown in FIG. 6, according to some implementations of the present disclosure.

Turning now to FIG. 9, an example sensor assembly 924 is schematically illustrated. Several example implementations of the sensor assembly 924 (e.g., the cameras 604 and 604B, the motion sensor assembly 610, and the contact sensor assemblies 606) are illustrated in FIG. 6 and described above. As shown in FIG. 9, the sensor assembly 924 may include at least one processor 902, volatile memory 904, non-volatile memory 908, at least one network interface 906, a battery assembly 916, an interconnection mechanism 918, and at least one sensor 922. The non-volatile memory 908 may store executable code 910 and, as illustrated, may also include a data store 912.

In some implementations, the features of the sensor assembly 924 enumerated above may be incorporated within, or included as a part of, a housing 920. Further, in some implementations, the sensor assembly 924 may additionally include a user interface 914.

In some implementations, the respective descriptions of the processor 702, the volatile memory 704, the non-volatile memory 708, the interconnection mechanism 718, and the battery assembly 716 with reference to the base station 612 are applicable to the processor 902, the volatile memory 904, the non-volatile memory 908, the interconnection mechanism 918, and the battery assembly 916 with reference to the sensor assembly 924. As such, those descriptions will not be repeated here.

Through execution of the code 910, the processor 902 may control operation of the network interface 906 and the user interface 914 (if present). In some implementations, the network interface 906 may include one or more physical interfaces (e.g., a radio, an ethernet port, a USB port, etc.) and a software stack including drivers and/or other code 910 that is configured to communicate with the one or more physical interfaces to support one or more LAN, PAN, and/or WAN standard communication protocols. Such communication protocols may include, for example, TCP and UDP, among others. As such, the network interface 906 may enable the sensor assembly 924 to access and communicate with other computing devices (e.g., the other devices disposed in the monitored location 602 of FIG. 6) via a computer network (e.g., the LAN established by the router 614). For instance, in some implementations, when executing the code 910, the processor 902 may control the network interface to stream (e.g., via UDP) sensor data acquired from the sensor assembly 922 to the base station 612. Further, in some implementations, through execution of the code 910, the processor 902 may additionally or alternatively control the network interface 906 to enter a power conservation mode, e.g., by powering down a 2.4 GHz radio and powering up a sub-GHz radio that are both included in the network interface 906. In such implementations, through execution of the code 910, the processor 902 may additionally control the network interface 906 to enter a streaming mode, e.g., by powering up a 2.4 GHz radio and powering down a sub-GHz radio, for example, in response to receiving a wake signal from the base station via the sub-GHz radio.

Through execution of the code 910, the processor 902 may additionally or alternatively control other operations of the sensor assembly 924. In some implementations, for example, a user interface 914 of the sensor assembly 924 may include user input and/or output devices (e.g., physical buttons, a touchscreen, a display, a speaker, a camera, an accelerometer, a biometric scanner, an environmental sensor, one or more LEDs, etc.) and a software stack including drivers and/or other code 910 that is configured to communicate with the user input and/or output devices. As such, the sensor assembly 924 may enable the user interface 914 to interact with users to receive inputs and/or render outputs. The outputs rendered by the user interface 814 may include, for example, one or more GUIs including one or more controls configured to display output and/or receive input. The inputs received by the user interface 914 may, for example, specify values that are to be stored in the data store 912. The outputs provided by the user interface 94 may further indicate values stored in the data store 912. In some implementations, parts of sensor assembly 924 may be accessible and/or visible as part of, or through, the housing 920.

As shown in FIG. 9, the sensor assembly 924 may include one or more types of sensors 922, such as one or more of the sensors described above with reference to the cameras 604 and 604B, the motion sensor assembly 610, and the contact sensor assembly 606 of FIG. 6, or other types of sensors. In some implementations, for example, the sensor(s) 922 may include a camera and a temperature sensor. Regardless of the type(s) of sensor(s) XD22 that employed, the processor 902 may (e.g., via execution of the code 910) acquire sensor data from the sensor(s) 922 and stream the acquired sensor data to the processor 902 for communication to the base station 612.

It should be noted that, in some implementations of the devices 802 and 902, the operations executed by the processors 802 and 902 while under control of respective control of the code 810 and 910 may be hardcoded and/or implemented using hardware, rather than as a combination of hardware and software.

Turning now to FIG. 10, aspects of the surveillance center environment 626, the monitoring center environment 622, one of the customer devices 624, the network(s) 620, and a plurality of monitored locations 602A through 602N (collectively referred to as the monitored locations 602) shown in FIG. 6 are schematically illustrated. As shown in FIG. 10, in some implementations, the surveillance service 630 may include a location data store 1002, an image data store 1004, an artificial intelligence (AI) service 1008, an event listening service 1010, an identity provider service 1012, a customer service 1038, a monitoring service 1040, and a camera streaming service 1042. As also shown in FIG. 10, the monitoring center environment 622 may include multiple monitoring devices 1016A through 1016M (collectively referred to as the monitoring devices 1016) that host or are otherwise configured to access respective monitoring applications 632A through 632M, and individual monitored locations 602A through 602N may include respective surveillance clients 616A through 616N (collectively referred to as the surveillance clients 616), e.g., within base stations 612 (not shown in FIG. 10) at the various monitored locations 602A through 602N. As described above in connection with FIGS. 1 and 2, in some implementations, the monitoring applications 632 may be configured to cause the monitoring devices 1016 to display screens 102, 110 that enable a monitoring agent 104 to visually monitor activity one or more of the monitored locations 602, as well as engage in an audio dialog with one or more individuals at such locations (e.g., via microphones and speakers of cameras 604 at the monitored locations 602). Further, as additionally shown in FIG. 10, in some implementations, the transport service(s) 628 may include multiple different transport services 628A through 628D configured to receive location data packages, e.g., location data packages 1014A through 1014D, from the surveillance clients 616A through 616N deployed at the respective monitored locations 602A through 602N.

The location data store 1002 of the surveillance service 630 may be configured to store, within a plurality of records, location data in association with identifiers of customers for whom the monitored location 602 is monitored. For example, the location data may be stored in a record with an identifier of a customer and/or an identifier of the monitored location 602 to associate the location data with the customer and the monitored location 602. The image data store 1004 of the surveillance service 630 may be configured to store, within a plurality of records, one or more frames of image data in association with identifiers of locations and timestamps at which the image data was acquired.

The AI service 1008 of the surveillance service 630 may be configured to process images and/or sequences of images to identify semantic regions, movement, human faces, and other features within images or a sequence of images. The event listening service 1010 of the surveillance service 630 may be configured to scan received location data for events and, where an event is identified, execute one or more event handlers to process the event. In some implementations, such event handlers may be configured to identify events and to communicate messages concerning those events to one or more recipient services (e.g., the customer service 1038 and/or the monitoring service 1040). Operations that may be performed by the customer service 1038 and/or the monitoring service 1040 based on the events identified by the event listening service 1010 are described further below. In some implementations, the event listening service 1010 may interoperate with the AI service 1008 to identify events within image data.

The identity provider service 1012 may be configured to receive authentication requests from the surveillance clients 616 that include security credentials. When the identity provider 1012 can authenticate the security credentials in a request (e.g., via a validation function, cross-reference lookup, or some other authentication process), the identity provider 1012 may communicate a security token in response to the request. A surveillance client 616 may receive, store, and include the security token in subsequent packages of location data (e.g., the location data 1014A), so that the recipient transport service (e.g., the transport service 628A) is able to securely process (e.g., unpack/parse) the packages to extract the location data prior to passing the location data to the surveillance service 630. In some implementations, for example, the security token may be a JSON Web Token (JWT)), such as the token 1802 that is described below in connection with FIG. 18.

The transport service(s) 628 of the surveillance center environment 626 may be configured to receive the location data packages 1014, verify the authenticity of the packages 1014, parse the packages 1014, and extract the location data encoded therein prior to passing the location data to the surveillance service 630 for processing. The location data that is so processed may include any of the location data types described above with reference to FIG. 6. In some implementations, individual transport services 628 may be configured to process location data packages 1014 generated by location-based monitoring equipment of particular manufacturers and/or models. The surveillance clients 616 may be configured to generate and communicate, e.g., to the surveillance service 630 via the network(s) 620, packages of location data (e.g., the location data packages 1014) based on sensor information received at the monitored locations 602.

The monitoring service 1040 may maintain records concerning the events identified by the event listening service 1010 and may assign individual events to various monitoring agents 104 who are currently on-line with monitoring applications 632. The monitoring application 632 operated by a given monitoring agent may then add the events assigned to that monitoring agent 104 to a queue of events, e.g., within the event windows 106 shown in FIG. 1, for review by that monitoring agent 104. In some implementations, a given monitoring application 632 may use data describing the events within its queue to retrieve location data and/or image data (from the location data store 1002 and/or the image data store 1004, respectively) for presentation within or in association with the event windows 106.

In response to the monitoring agent 104 identifying a particular event to review (e.g., by clicking on one of the event windows 106), the monitoring service 1040 may interact with the camera streaming service 1042 to obtain access credentials to enable the establishment of peer-to-peer connections with one or more cameras 604 at the monitored location 602 corresponding to the event, and to review live video and/or audio streamed from those cameras, e.g., within the video feed windows 112 and/or the main viewer window 114 shown in FIG. 2, as well as to verbally communicate in real time with one or more individuals in the vicinity of the camera(s) 604. Example interactions amongst components of the security system 600 to enable the streaming of video and/or audio data between the camera(s) 604 at the monitored location 602 and the monitoring application 632 operated by the monitoring agent 104 are described below in connection with FIG. 12.

Figure 11:
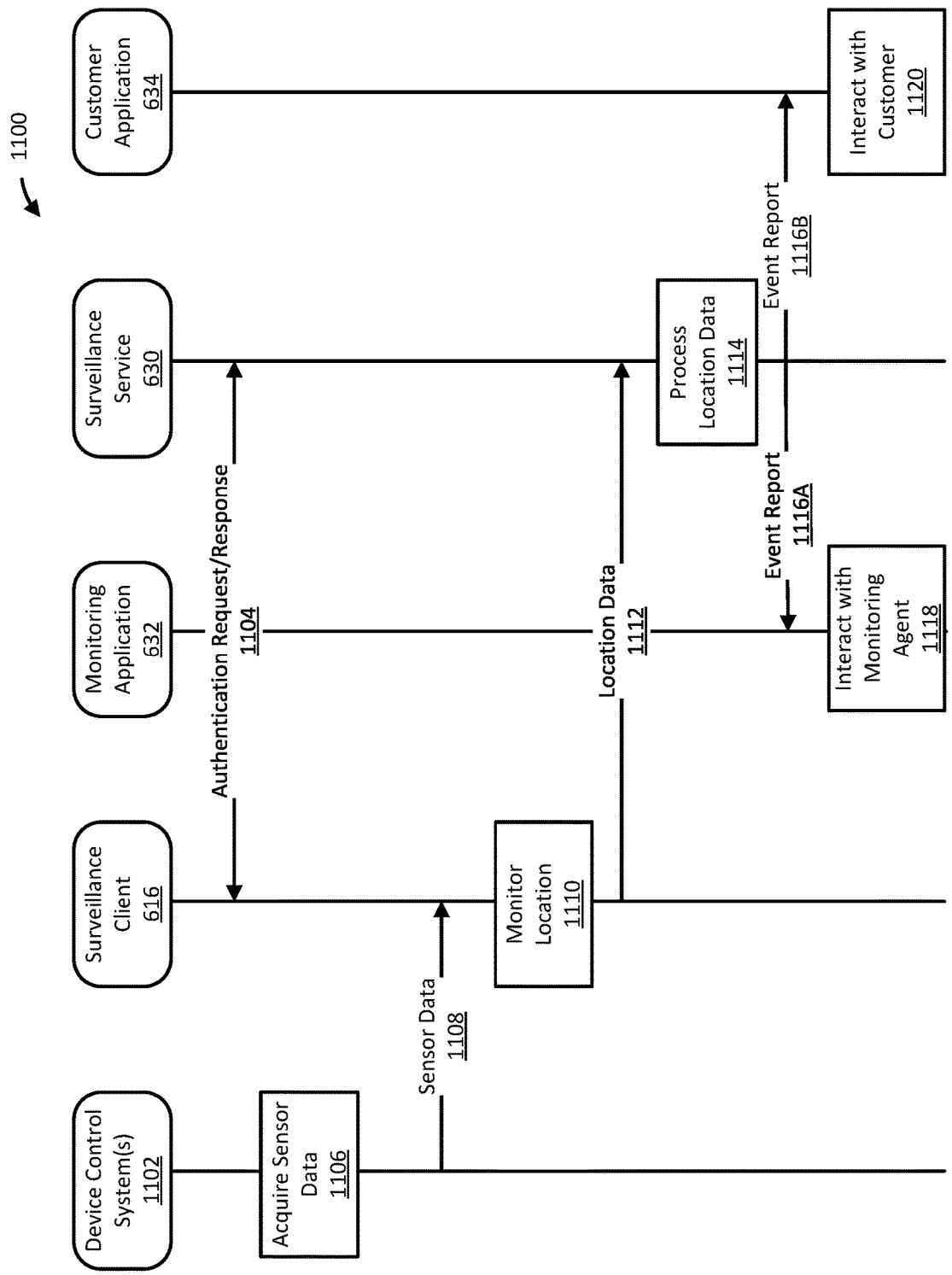
FIG. 11 is a sequence diagram of a monitoring process that may be performed by components of the security system shown in FIG. 6, according to some implementations of the present disclosure.

Turning now to FIG. 11, an example monitoring process 1100 that may be employed by the security system 600 is illustrated as a sequence diagram. In particular, in some implementations, various portions of the process 1100 may be executed by (A) one or more location-based devices (e.g., the devices 604 through 610 of FIG. 6) under the control of device control system (DCS) code (e.g., either the code 810 or 910) implemented by at least one processor (e.g., either of the processors 802 or 902 of FIG. 8 or 9); (B) a base station (e.g., the base station 612 of FIG. 6) under control of a surveillance client (e.g., the surveillance client 616 of FIG. 6); (C) a monitoring center environment (e.g., the monitoring center environment 622 of FIG. 6) under control of a monitoring application (e.g., the monitoring application 632 of FIG. 6); (D) a surveillance center environment (e.g., the surveillance center environment 626 of FIG. 6) under control of a surveillance service (e.g., the surveillance service 630 of FIG. 6); and (E) a customer device (e.g., the customer device 624 of FIG. 6) under control of a customer application (e.g., customer application 634 of FIG. 6).

As shown in FIG. 11, the process 1100 may begin with the surveillance client 616 authenticating with the surveillance service 630 by exchanging one or more authentication requests and responses 1104 with the surveillance service 630. More specifically, in some implementations, the surveillance client 616 may communicate an authentication request to the surveillance service 630 via one or more API calls to the surveillance service 630. In such implementations, the surveillance service 630 may parse the authentication request to extract security credentials therefrom and pass such security credentials to an identity provider (e.g., the identity provider service 1012 of FIG. 10) for authentication. In some implementations, upon the identity provider authenticating the security credentials, the surveillance service 630 may generate a security token and communicate that security token as a payload within an authentication response to the authentication request. In such implementations, if the identity provider is unable to authenticate the security credentials, the surveillance service 630 may instead generate an error (e.g., an error code) and communicate that error as the payload within the authentication response to the authentication request. Upon receipt of the authentication response, the surveillance client 616 may parse the authentication response to extract the payload. If the payload includes the error code, the surveillance client 616 may retry authentication and/or interoperate with a user interface of its host device (e.g., the user interface 714 of the base station 612 of FIG. 7) to render output indicating the authentication failure. If the payload includes the security token, the surveillance client 616 may store the security token for subsequent use in communication of location data. It should be noted that, in some implementations, the security token may have a limited lifespan (e.g., one hour, one day, one week, one month, etc.) after which the surveillance client 616 may be required to reauthenticate with the surveillance service 630. In some implementations, for example, the lifespan of the security token (e.g., a token 1802 of the type described below in connection with FIG. 18) may be defined within the header 1804 and/or the payload 1806 of the token 1802 (e.g., as one or more claims).

Continuing with the process 1100, one or more device control systems 1102 hosted by one or more location-based devices may acquire (1106) sensor data descriptive of a location (e.g., the monitored location 602 of FIG. 6). The sensor data that is so acquired may be any of a variety of types, as discussed above with reference to FIGS. 6-10. In some implementations, one or more of the device control systems 1102 may acquire sensor data continuously. In other implementations, one or more of the DCSs 1102 may additionally or alternatively acquire sensor data in response to an event, such as expiration of a timer (a push event) or receipt of an acquisition polling signal communicated by the surveillance client 616 (a poll event). In some implementations, one or more of the device control systems 1102 may stream sensor data to the surveillance client 616 with minimal processing beyond acquisition and digitization. In such implementations, the sensor data may constitute a sequence of vectors with individual vector members including, for example, a sensor reading and a timestamp. In some implementations, one or more of the device control systems 1102 may execute additional processing of sensor data, such as generation of one or more summaries of multiple sensor readings. Further still, in some implementations, one or more of the device control systems 1102 may execute sophisticated processing of sensor data. For example, if the sensor(s) 922 of a sensor assembly 924 (shown in FIG. 9) include an image capture device, the device control system 1102 may execute image processing routines such as edge detection, motion detection, facial recognition, threat assessment, event generation, etc.

Continuing with the process 1100, the device control component(s) 1102 may communicate the sensor data 1108 to the surveillance client 616. As with sensor data acquisition, the device control system(s) 1102 may communicate the sensor data 1108 continuously or in response to an event, such a push event (originating with the device control system(s) 1102) or a poll event (originating with the surveillance client 616).

Continuing with the process 1100, the surveillance client 616 may monitor (1110) the monitored location 602 by processing the received sensor data 1108. In some implementations, for example, the surveillance client 616 may execute one or more image processing routines. Such image processing routines may include any of the image processing routines described above with reference to the operation 1106. By distributing at least some of the image processing routines between the device control system(s) 1102 and surveillance client 616, the amount of power consumed by battery-powered devices may be decreased by off-loading processing to line-powered devices. Moreover, in some implementations, the surveillance client 616 may execute an ensemble threat detection process that utilizes sensor data 1108 from multiple, distinct device control systems 1102 as input. For instance, in some implementations, the surveillance client 616 may attempt to corroborate an open state received from a contact sensor with motion and facial recognition processing of an image of a scene including a window or door to which the contact sensor is affixed. If two or more of the three processes indicate the presence of an intruder, a score (e.g., a threat score) may be increased and or a break-in event may be declared, locally recorded, and communicated. Other processing that the surveillance client 616 may execute includes outputting local alerts (e.g., in response to detection of particular events and/or satisfaction of other criteria) and detection of maintenance conditions for location-based devices, such as a need to change or recharge low batteries and/or replace/maintain the devices that host the device control system(s) 1102. Any of the processes described above within the operation 1110 may result in the creation of location data that specifies the results of such processes.

Continuing with the process 1100, the surveillance client 616 may communicate the location data 1112 to the surveillance service 630 (via the transport service(s) 628). As with the communication of the sensor data 1108, the surveillance client 616 may communicate the location data 1112 continuously or in response to an event, such as a push event (originating with the surveillance client 616) or a poll event (originating with the surveillance service 630).

Continuing with the process 1100, the surveillance service 630 may process (1114) the received location data. In some implementations, for example, the surveillance service 630 may execute one or more of the processes described above with reference to the operations 1106 and/or 1110. In some implementations, the surveillance service 630 may additionally or alternatively calculate a score (e.g., a threat score) or further refine an existing score using historical information associated with the monitored location 602 identified in the location data and/or other locations geographically proximal to the monitored location 602 (e.g., within the same zone improvement plan (ZIP) code). For instance, in some implementations, if multiple break-ins have been recorded for the monitored location 602 and/or other locations within the same ZIP code, the surveillance service 630 may increase a score calculated by a device control system 1102 and/or the surveillance client 616.

In some implementations, the surveillance service 630 may apply a set of rules and criteria to the location data 1112 to determine whether the location data 1112 includes any events and, if so, communicate an event report 1116A and/or 1116B to the monitoring application 632 and/or the customer application 634. In some implementations, for example, the monitoring service 1040 may assign one or more events to a particular monitoring agent 104, so that those events will be forwarded to the monitoring application 632 that the monitoring agent 104 is operating, e.g., for presentation within respective event windows 106 (shown in FIG. 1). An event may, for example, be an event of a certain type (e.g., break-in) or an event of a certain type that satisfies additional criteria (e.g., movement within a particular zone combined with a threat score that exceeds a threshold value). The event reports 1116A and/or 1116B may have a priority based on the same criteria used to determine whether the event reported therein is reportable or may have a priority based on a different set of criteria or rules.

Continuing with the process 1100, the monitoring application 632 within the monitoring center environment 622 may interact (1118) with monitoring agents 104 through, for example, one or more GUIs, such as the screens 102 and 110 shown in FIGS. 1 and 2. Such GUIs may provide details and context regarding one or more events.

As shown in FIG. 11, the customer application 634 of a customer device 624 (e.g., a smartphone, personal computer, or other endpoint device) may likewise interact (1120) with at least one customer through, for example, one or more GUIs. Such GUIs may provide details and context regarding one or more events.

It should be noted that the processing of sensor data and/or location data, as described above with reference to the operations 1106, 1110, and 1114, may be executed by processors disposed within various parts of the security system 600. In some implementations, the device control system(s) 1102 may execute minimal processing of the sensor data (e.g., acquisition and streaming only) and the remainder of the processing described above may be executed by the surveillance client 616 and/or the surveillance service 630. This approach may be helpful to prolong battery runtime of location-based devices. In other implementations, the device control system(s) 1102 may execute as much of the sensor data processing as possible, leaving the surveillance client 616 and the surveillance service 630 to execute only processes that require sensor data that spans location-based devices and/or locations. Such an approach may be helpful to increase scalability of the security system 600 with regard to adding new locations.

Figure 12:
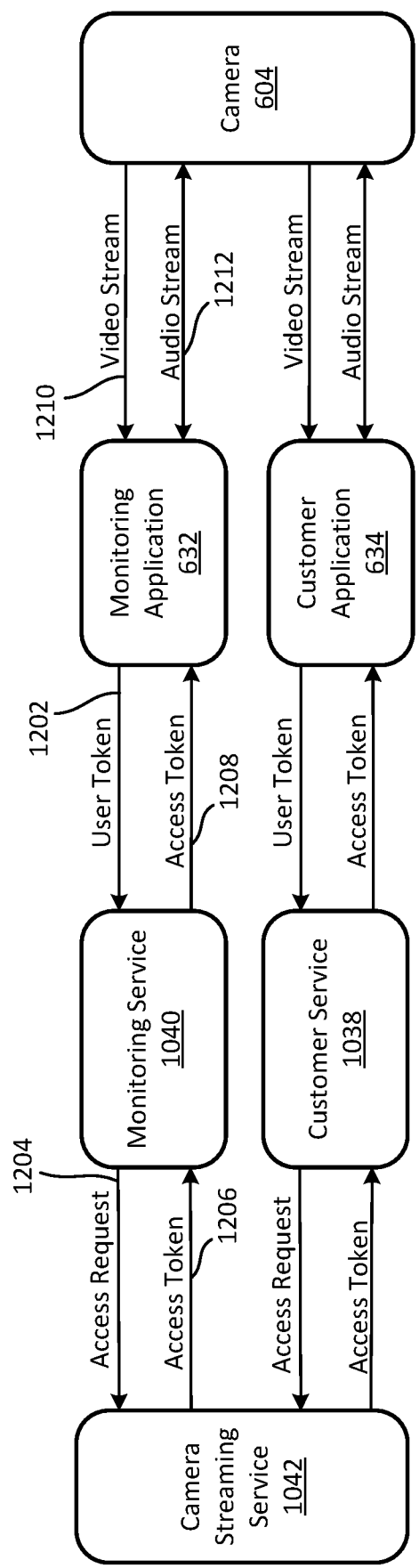
FIG. 12 shows example processes for establishing peer-to-peer connections between components of the security system shown in FIG. 6, to enable the streaming of video and/or audio data, according to some implementations of the present disclosure.
Figure 13:
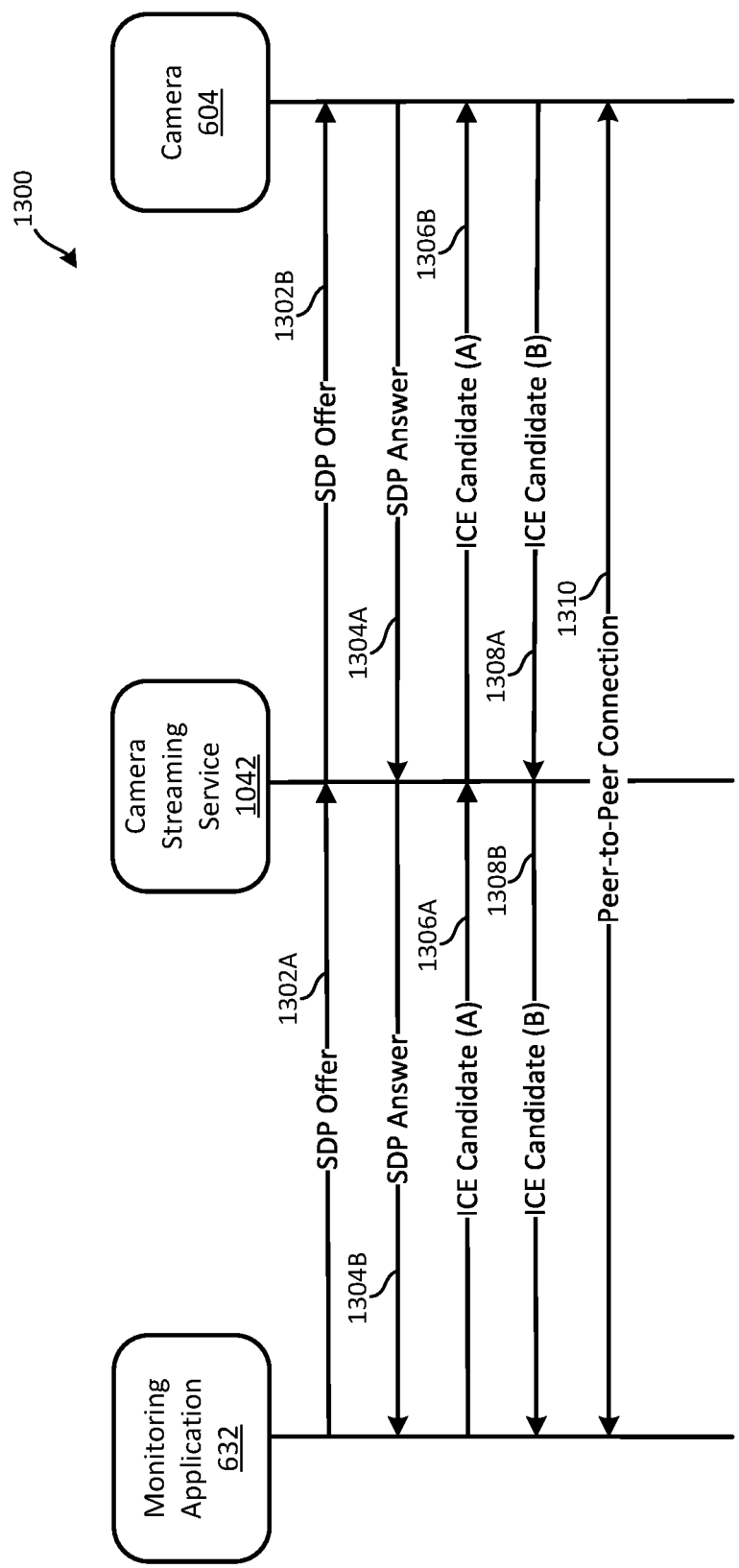
FIG. 13 is a sequence diagram showing an example signaling process that can be employed to establish peer-to-peer connections between components of the security system shown in FIG. 6, to enable the streaming of video and/or audio data, according to some implementations of the present disclosure.

FIGS. 12 and 13 illustrate an example technique for establishing point-to-point connections (e.g., for video and/or audio streaming) between a camera 604 at a monitored location 602 and either or both of (A) a monitoring application 632 hosted on or otherwise accessible by a monitoring device 1016, and (B) a customer application 634 hosted on or otherwise accessible by a customer device 624. In some implementations, the monitoring application 632 and the customer application 634 may be web applications that are accessed using browsers hosted on the monitoring device 1016 and the customer device 624, respectively, and the WebRTC functionality of those browsers may be used to establish peer-to-peer connections with the camera 604. As described below in connection with FIG. 13, the camera streaming service 1042 may provide signaling channels that are used establish peer-to-peer connections between the camera 604 and the respective browsers. As one example, the camera streaming service 1042 may be implemented using the Amazon Kinesis Video Streams service offered by Amazon Web Services (AWS).

As indicated by an arrow 1202 in FIG. 12, the monitoring application 632 may provide a user token to the monitoring service 1040. The user token may correspond to the monitoring agent 104 who has authenticated to monitoring application 632 and may be included in a request for live-streaming access to the camera(s) 604 at a monitored location 602. In some implementations, for example, such a camera access request may be sent from the monitoring application 632 to the monitoring service 1040 in response to a monitoring agent 104 selecting an event window 106 corresponding to a particular camera 604 as described above in connection with FIGS. 1 and 2. In some implementations, the user token may be a JWT, such as the token 1802 that is described below in connection with FIG. 18.

The monitoring service 1040 may evaluate the user token received from the monitoring application 632 (e.g., by validating a signature 1808 of the token as described below in connection with FIG. 18) and, if valid, may communicate with the camera streaming service 1042 to obtain an access token that the monitoring application 632 may subsequently use to access a signaling channel of the camera streaming service 1042. An example process by which signaling information may be exchanged between the monitoring application 632 and the camera 604, via a signaling channel established by the camera streaming service 1042, to determine configuration information for a peer-to-peer connection between the monitoring application 632 and the camera 604 is described below in connection with FIG. 13. In some implementations, the access token obtained from the camera streaming service 1042 may be a JWT, such as the token 1802 that is described below in connection with FIG. 18.

As indicated by an arrow 1204 in FIG. 12, in some implementations, the monitoring service 1040 may authenticate to the camera streaming service 1042 and request access to the camera streaming service 1042 on behalf of the monitoring application 632 that provided the user token (per the arrow 1202). In some implementations, the access request the monitoring service 1040 sends to the camera streaming service 1042 may specify one or more parameters that identify the specific monitored location 602 at issue, the specific camera(s) 604 to which access is to be granted, a specific time window during which access to such cameras 604 is to be granted, and/or other any of a number of other limitations or restrictions concerning whether and/or how access to the camera(s) 604 is to be permitted. The use of such parameters can help ensure that the camera(s) 604 are accessed only by authorized personnel and only as needed to evaluate a specific event.

Upon authenticating the access request received from the monitoring service 1040, the camera streaming service 1042 may establish a signaling channel between the monitoring application 632 and the camera 604, and generate an access token (e.g., a token 1802 of the type described below in connection with FIG. 18) that the monitoring application 632 can subsequently use to access that signaling channel (e.g., by making Web API calls to an API endpoint of the camera streaming service 1042). In some implementations, the monitoring service 1040 may configure the access token to include one or more of the parameters that were specified in the access request. For example, in some implementations, such parameters may be defined within a header 1804 and/or a payload 1806 of the access token (e.g., as one or more claims).

As indicated by arrows 1206 and 1208 in FIG. 12, the camera streaming service 1042 may send the generated access token to the monitoring service 1040, and the monitoring service 1040 may then pass that access token to the monitoring application 632. In some implementations, the camera streaming service 1042 may also send additional information along with the access token, such as a network address (e.g., a Web API endpoint) for the signaling channel established by the camera streaming service 1042, thus allowing the monitoring application 632 to make Web API calls to the camera streaming service 1042 for signaling purposes. As noted previously, the access token generated by the camera streaming service 1042 may be configured based on the parameters that were included in the access request the monitoring service 1040 sent to the camera streaming service 1042, so as to limit the ability of the recipient monitoring application 632 to access the established signaling channel in the manner defined by those parameters. For example, the access token generated by the camera streaming service 1042 may be set to expire after a particular time period based on a time limit parameter that was included in the access request.

As described below in connection with FIG. 13, upon receipt of the access token from the monitoring service 1040, the monitoring application 632 may send a session description protocol (SDP) offer to a network address of the signaling channel and the signaling channel may forward that SDP offer to the camera 604, thus initiating the signaling process to establish a peer-to-peer connection between the monitoring application 632 and the identified camera 604. Finally, as also described below in connection with FIG. 13, as indicated by arrows 1210 and 1212 in FIG. 12, upon identifying suitable interactive connectivity establishment (ICE) candidates, one or more peer-to-peer connections may be established between the monitoring application 632 and the camera 604, thus enabling the streaming of video data from the camera 604 to the monitoring application 632 and/or the exchange of audio data between the monitoring application 632 and the camera 604.

A similar process may be employed to establish one or more peer-to-peer connections between the customer application 634 and one or more camera(s) 604 at the monitored location, thus enabling the streaming of video data from the camera(s) 604 to the customer application 634 and/or the exchange of audio data between the customer application 634 and the camera(s) 604. That process will thus not be described again here. It should be appreciated, however, that the scope of the permissions provided in the access requests that are sent from the customer service 1038 to the camera streaming service 1042 may be different (e.g., less restrictive) than the scope of the permissions provided by access requests that are sent from the monitoring service 1040 to the camera streaming service 1042, as it may not be desirable to restrict a customer's ability to live stream with the camera in the same manner as the monitoring agents 104.

FIG. 13 is a sequence diagram 1300 illustrating how signaling information (e.g., WebRTC signaling information) can be exchanged between the monitoring application 632 (or alternatively the customer application 634) and a camera 604, via the camera streaming service 1042, to establish a peer-to-peer connection between the monitoring application 632 (or alternatively the customer application 634) and the camera 604. Although FIG. 13 depicts the exchange of signaling information between the monitoring application 632 and the camera 604, and the following section describes the exchange of signaling information between those two components, it should be appreciated that the same process may likewise be used to exchange signaling information between the customer application 634 and the camera 604.

As noted above, in some implementations, the monitoring application 632 may have received an access token for the camera streaming service 1042 from the monitoring service 1040 (see the arrow 1208 in FIG. 12) in response to providing a user token to the monitoring service 1040 (see the arrow 1202 in FIG. 12), and such access token may enable the monitoring application 632 to access a signaling channel established by the camera streaming service 1042, thus allowing the monitoring application 632 to make Web API calls to the camera streaming service 1042 for signaling purposes.

As shown in FIG. 13, the signaling process may begin with the monitoring application 632 using the received access token to send (1302A, 1302B) an SDP offer to the camera 604 (via the camera streaming service 1042). The monitoring application 632 may create the SDP offer, for example, by calling the CreateOffer( ) function of the WebRTC application programing interface (API) of a browser or other WebRTC-enabled component of the monitoring device 1016.

The SDP offer may include information about the kind of media that is to be sent by the monitoring device 1016, its format, the transfer protocol being used, the internet protocol (IP) address and port of the monitoring device 1016, and/or other information needed to describe the to-be-transferred media and/or the monitoring device 1016.

Upon receiving the SDP offer from the monitoring application 632, the camera 604 may send (1304A, 1304B) an SDP answer to the monitoring application 632 via the camera streaming service 1042. The camera 604 may create the SDP answer, for example, by calling the CreateAnswer( ) function of the WebRTC API of a browser or other WebRTC-enabled component of the camera 604. The SDP answer may include information about the kind of media that is to be sent by the camera 604, its format, the transfer protocol being used, the internet protocol (IP) address and port of the camera 604, and/or other information needed to describe the to-be-transferred media and/or the camera 604.

In addition to sharing information about the media that is to be exchanged and the respective devices that will be exchanging it, the monitoring application 632 and the camera 604 may share information about the network connections they are able to use to exchange that media. In particular, the monitoring application 632 may share one or more ICE candidates with the camera 604, and vice versa, with the individual ICE candidates sent by a device describing the available methods that device is able to use to communicate (either directly or through a traversal using relays around NAT (TURN) server). The monitoring application 632 and the camera 604 may gather ICE candidates, for example, by creating an ICE candidate event listener using the WebRTC API (e.g., by calling the function peerConnection.addEventListener('icecandidate', event=>{ . . . }).

In some implementations, the respective devices may propose their best ICE candidates first, making their way down the line toward their worse candidates. Ideally, ICE candidates employ the user data protocol (UDP) (since it's faster, and media streams are able to recover from interruptions relatively easily), but the ICE standard does allow transmission control protocol (TCP) candidates as well.

Possible UDP candidate types include host, peer reflexive (prflx), server reflexive (srflx), and relay. A "host" candidate is one for which its IP address is the actual, direct IP address of the remote peer. A "peer reflexive" candidate is one whose IP address comes from a symmetric network address translation (NAT) between the two peers. A "server reflexive" candidate is generated by a session traversal of UDP through NAT (STUN) server. A relay candidate is generated by a TURN server. Possible TCP candidate types include active, passive, and so. An "active" transport will try to open an outbound connection but won't receive incoming connection requests. A "passive" transport will receive incoming connection attempts but won't attempt a connection itself. A "so" transport will try to simultaneously open a connection with its peer.

As an example, FIG. 13 illustrates how the monitoring application 632 may send (1306A, 1306B) ICE candidate "A" to the camera 604, and the camera 604 may send (1308A, 1308B) ICE candidate "B" to the monitoring application 632. Different pairs of the identified ICE candidates may be tested and one of the endpoints which has been designated as the "controlling agent" may select one of the identified ICE candidate pairs to use to establish (1310) a peer-to-peer connection between the monitoring application 632 and the camera 604.

Additional information concerning the use of WebRTC to establish peer-to-peer connections can be found on the web pages accessible via the uniform resource locator (URL) "webrtc.org," the entire contents of which are hereby incorporated herein by reference.

FIGS. 14A-G illustrate example routines 1400, 1410, 1420, 1440, 1460, 1470, and 1480 that may be employed by one or more components of the surveillance service 630 (e.g., the monitoring service 1040 shown in FIG. 10) to monitor and maintain the status table 302 (described above in connection with FIGS. 3, 4A and 4B) to enable certain of the functionality described herein, in accordance with some implementations of the present disclosure. Examples of ways in which the surveillance service 630 may modify the contents of the status table 302 based on actions taken by monitoring agents 104 (e.g., by interacting with monitoring applications 632 using monitoring devices 1016) are described below in connection with the example routine 1500 shown in FIG. 15. Examples of ways in which the surveillance service 630 (e.g., the monitoring service 1040 shown in FIG. 10) may use the contents of the status table 302 to cause a device operated by a customer to present information about detected events at a monitored location 602 in a grouped fashion are described below in connection with the example routine 1600 shown FIG. 16. Each of the aforementioned example routines will now be described in detail.

FIG. 14A illustrates an example routine 1400 that the surveillance service 630 may perform to cause events to be added to the review queues of available monitoring agents 104 based on the current contents of the status table 302.

As shown in FIG. 14A, at a step 1402 of the routine 1400, the surveillance service 630 may determine (e.g., by evaluating the current contents of the status table 302) that the status table 302 includes data for an event (e.g., identified by an event ID 304) that has a "New" status identifier 316 and that is not currently assigned to a monitoring agent 104 for review, e.g., for which the agent ID 320 is set to "Unassigned."

At a step 1404 of the routine 1400, the surveillance service 630 may determine (e.g., by evaluating the current contents of the status table 302) that the event identified at the step 1402 has image data 312 (e.g., a video clip) associated with it. In some implementations, the surveillance service 630 may be configured to identify events that do not have image data 630 associated with them (e.g., door lock state changes) and may present data concerning such events to monitoring agents in at least some circumstances (e.g., within one or more of the event data windows 502 shown in FIG. 5), but may also be configured to initially present monitoring agents with notifications of only those events that have image data associated with them, e.g., by presenting video clips within the event windows 106 shown in FIG. 1. The step 1404 may thus enable the identification of events that are suitable to present within the event windows 106 (e.g., as video clips).

At a step 1406 of the routine 1400, the surveillance service 630 may determine that the unassigned event identified at the step 1402 occurred less than a threshold period of time in the past (e.g., within the previous thirty minutes). The step 1406 may be useful, for example, in a system with which the primary focus is incident avoidance, as it may allow the surveillance service 630 to filter out data that is likely too stale to allow a monitoring agent to take steps to intervene and stop a crime or other incident before it starts or while it is still in progress. Filtering out such "stale" event-related data may thus free up the monitoring agents 104 to focus on more contemporaneous data that is more likely to allow them to intervene in an incident in a meaningful way.

At a step 1408 of the routine 1400, the surveillance service 630 may assign the event identified at the step 1402 (assuming it met the criteria determined at the steps 1404 and 1406, if those steps are performed) to an available monitoring agent 104, e.g., by writing the agent ID of a particular monitoring agent 104 in the row for that event. In some implementations, once the agent ID 320 of a monitoring agent 104 has been written to the status table 302 for an event, that event may be considered to have been placed in the review queue for that monitoring agent 104.

Notifications of any such events may thereafter be dispatched to a monitoring device 1016 operated by that monitoring agent 104, e.g., for review within the event windows 106 of the screen 102 shown in FIG. 1.

FIG. 14B illustrates an example routine 1410 that the surveillance service 630 may perform to cause events to be removed from the review queues of monitoring agents 104 based on the current contents of the status table 302.

Figure 14C:
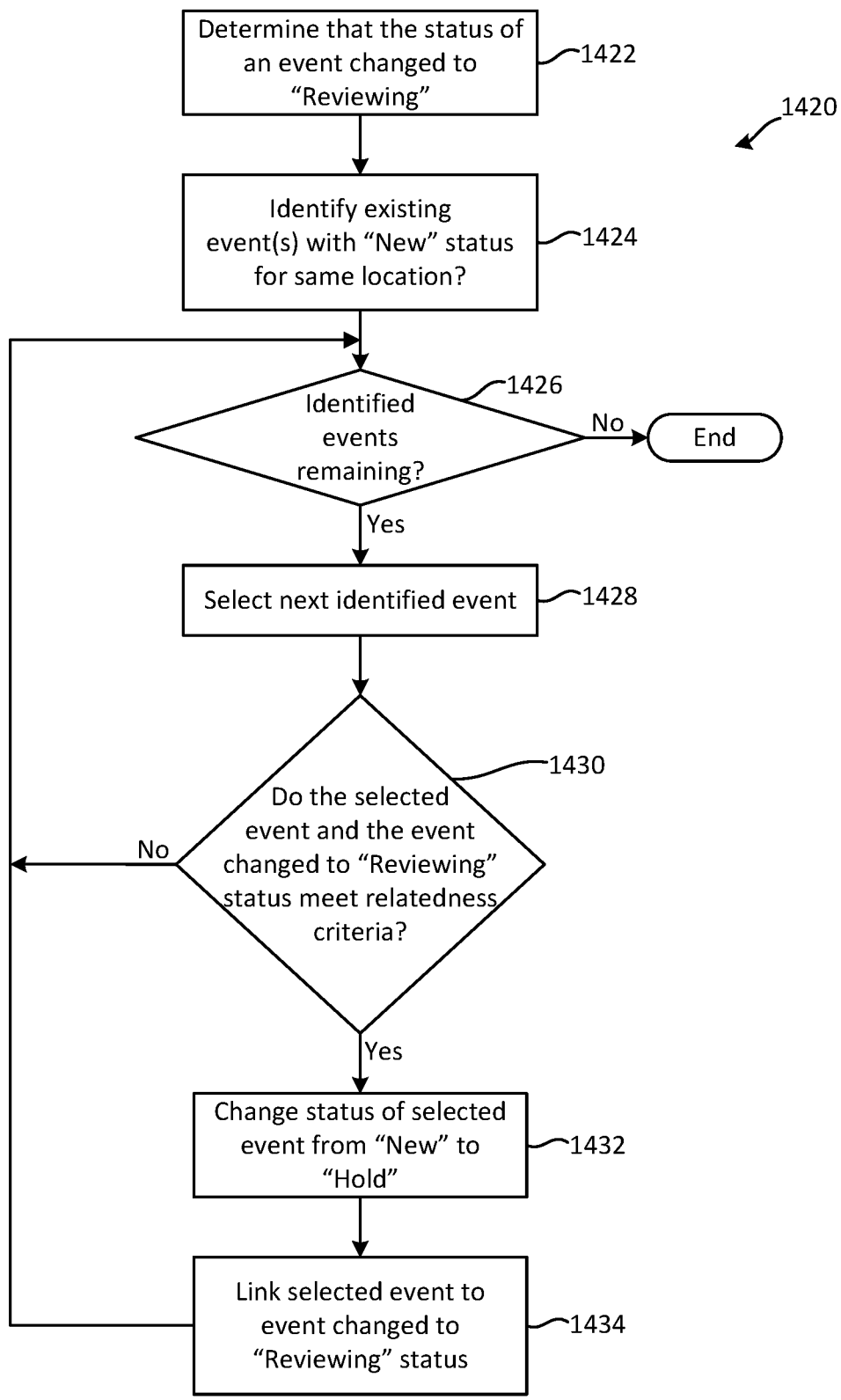
FIG. 14C is a flowchart showing an example routine that may be performed one or more components of the surveillance service described herein when a monitoring agent begins actively reviewing an event to identify other events that are likely related to event being reviewed, and to change that status indicators of such likely related events to "Hold."

As shown in FIG. 14B, at a step 1412 of the routine 1410, the surveillance service 630 may determine that the status identifier 316 for an event represented in the status table 302 (e.g., identified by an event ID 304) has been changed to "Hold." As described below in connection with FIG. 14C, such a status change may occur, for example, in response to the status of another event from the same monitored location 602 changing to "New" to "Reviewing" when a monitoring agent 104 begins to review the other event (e.g., by selecting one of the event windows 106 of the screen 102 shown in FIG. 1).

At a step 1414 of the routine 1410, the surveillance service 630 may cause the event to be removed from the review queue of the monitoring agent 104 to whom the event is currently assigned, e.g., by removing the Agent ID 320 of that monitoring agent from the row of the event in the status table 302.

FIG. 14C illustrates an example routine 1420 that may be performed by one or more components of the surveillance service 630 (e.g., the monitoring service 1040 shown in FIG. 10) when a monitoring agent 104 begins actively reviewing an event (e.g., by selecting one of the event windows 106 of the screen 102 shown in FIG. 1) to identify other events that are likely related to event being reviewed, and to change that status indicators 316 of such likely related events to "Hold." As described elsewhere herein, marking events as "Hold" in this manner may cause those events to be removed from the review queues of other monitoring agents 104 and/or may preclude such events from being subsequently added to the review queues of other monitoring agents 104.

As shown in FIG. 14C, the routine 1420 may begin at a step 1422, at which the surveillance service 630 may determine (e.g., by detecting a state change to the contents of the status table 302) that the status indicator 316 of an event represented in the status table 302 has been changed to "Reviewing." As described below in connection with the step 1506 of the routine 1500 shown in FIG. 15, such a status change may occur in response to a monitoring agent 104 beginning to actively review that event (e.g., by selecting one of the event windows 106 of the screen 102 shown in FIG. 1). In the example scenario shown in FIG. 4A, for example, upon a monitoring agent 104 beginning to actively review the event "E1," the status indicator 316 for the event "E1" has been changed from "New" to "Reviewing."

At a step 1424 of the routine 1420, the surveillance service 630 may identify one or more other events reflected in the status table 302 that (A) were detected at the same monitored location 602 as the event under review, and (B) that have status indicators 316 of "New." In some implementations, the surveillance service 630 may determine that two events were detected at the same monitored location 602 by determining that the two events have the same location ID 308 (or perhaps the same camera ID 310) in the status table 302.

In some implementations, per a decision 1426 and a selection step 1428, the surveillance service 630 may cycle through the events identified at the step 1424 (or alternatively may evaluate such identified events in parallel) to determine, per a decision 1430, whether such identified events meet one or more additional criteria for determine whether such events are likely related to the same incident as the event under review. In other implementations, the surveillance service 630 may omit the decision 1430 and instead simply treat all identified events from the same monitored location 602 as being related to the event under review. When employed, the decision 1430 may involve determining whether the event under consideration occurred within a time window keyed off the timestamp 306 of the event that is being actively reviewed by the agent 104. For example, in some implementations, the surveillance service 630 may determine whether the timestamp 306 for the event under consideration indicates that event occurred within a time window that begins five minutes before and ends five minutes after the time indicated by the timestamp 306 of the event being actively reviewed by the monitoring agent 104. Time windows measured in other ways and/or of other durations may alternatively be used in connection with the decision 1430 to optimize performance of the system. Further, in some implementations, different or additional relatedness criteria may be employed in connection with the decision 1430 for optimization purposes.

When, at the decision 1430, the surveillance service 630 determines that the selected event meets the additional criteria for determining whether it is likely related to the same incident as the event under review, the routine 1420 may proceed to a step 1432, at which the surveillance service 630 may change the status indicator 316 in the status table 302 for the event under consideration (e.g., the event selected at the step 1428) from "New" to "Hold." In the example scenario shown in FIG. 4A, for example, the status indicator 316 for the events "E2" and "E4" reflected in the status table 302 has been changed from "New" to "Hold." As noted previously, marking events as "Hold" in this manner may cause those events to be removed from the review queues of other monitoring agents 104 and/or may preclude such events from being subsequently added to the review queues of other monitoring agents 104.

At a step 1434 of the routine 1420, the surveillance service 630 may link the event under consideration (e.g., the event selected at the step 1428) to the event whose status indicator 316 was changed to "Reviewing" (per the step 1422). In some implementations, such linking may be accomplished by adding to the status table 302 the event ID 304 of the event being actively reviewed as a linked event 318 for the event under consideration. In the example scenario shown in FIG. 4A, for example, the event ID "E1" has been added as a linked event 318 for each of the events "E2" and "E4." As described in more detail below in connection with FIGS. 14E, 14F and 14G, the linking of "related" events to events actively being reviewed by monitoring agents 104 may allow such events to be treated as a group for the purpose of assigning a revised status (e.g., "New," "Clear," or "Threat") to all such events following initial review by a monitoring agent 104. Further, as described in more detail below in connection with FIGS. 16, the linking of "related" events to events that have been actively reviewed by monitoring agents 104 may allow such events to be treated as a group when reporting a reviewed incident to a customer, or when presenting notifications of events to a customer (e.g., as a timeline of incidents that each includes a set of grouped events).

Figure 14D:
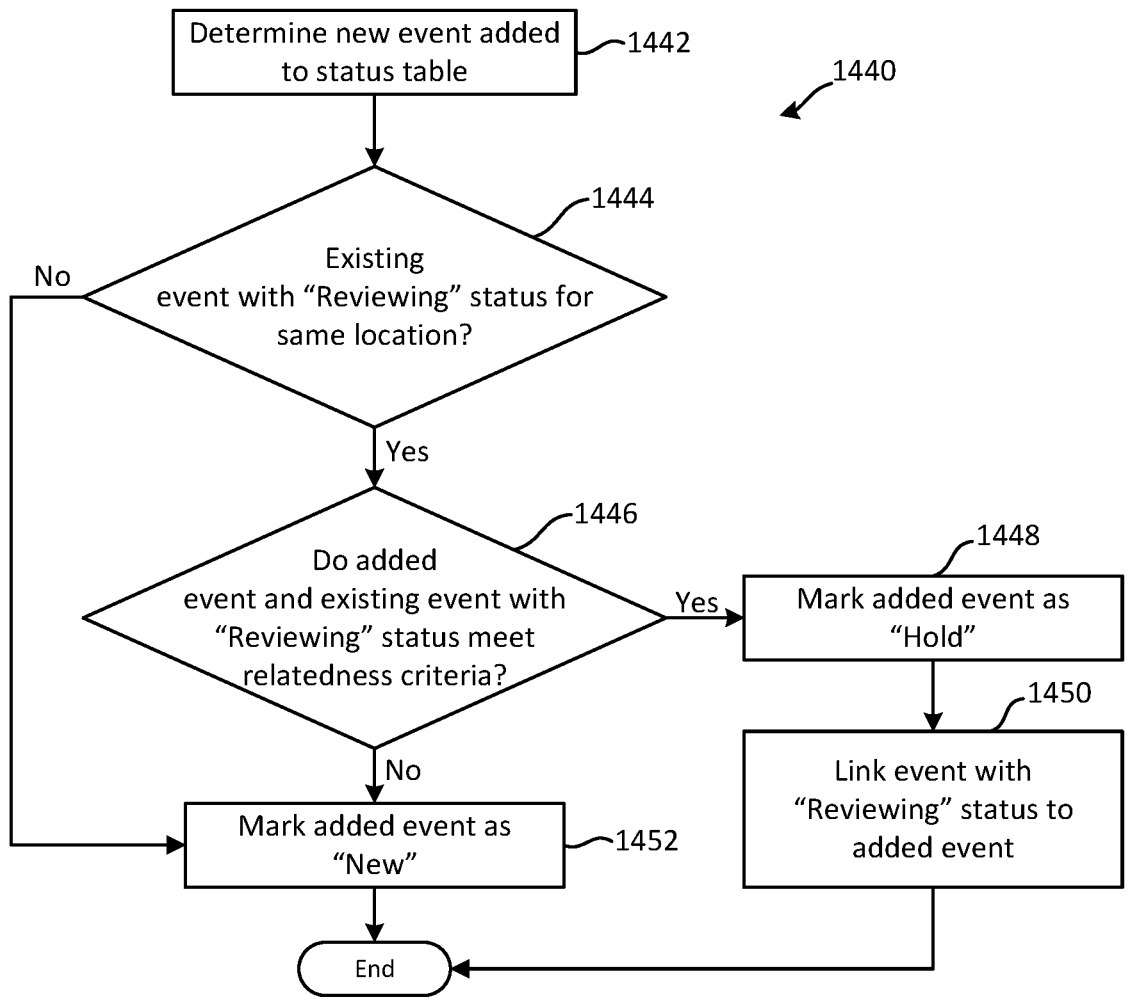
FIG. 14D is a flowchart showing an example routine that may be performed one or more components of the surveillance service described herein to determine whether that status indicator for a new event that is added to the status table shown in FIG. 3 should be marked as "New," thus allowing it to be assigned to an available monitoring agent, or as "Hold," thus preventing it from being assigned to a monitoring agent.

FIG. 14D illustrates an example routine 1440 that may be performed by one or more components of the surveillance service 630 (e.g., the monitoring service 1040 shown in FIG. 10) to determine whether that status indicator 316 for a new event that is added to the status table 302 should be marked as "New," thus allowing it to be assigned to an available monitoring agent 104, or as "Hold," thus preventing it from being assigned to a monitoring agent 104.

As shown in FIG. 14D, the routine 1440 may begin at a step 1442, at which the surveillance service 630 may determine that a new event has been added to the status table 302, e.g., by detecting the addition of a new event ID 304 to the status table 302.

At a decision 1444, the surveillance service 630 may determine, whether the status table 302 includes another event that (A) was detected at the same monitored location 602 (e.g., by determining that it includes the same location ID 308 as the newly detected event), and (B) has a status indicator 316 that is set to "Reviewing," thus determining whether a monitoring agent 104 is actively reviewing another event at the same monitored location 602 as the newly detected event.

When, at the decision 1444, the surveillance service 630 determines that a monitoring agent 104 is actively reviewing another event at the same monitored location 602 as the newly detected event, the routine 1440 may proceed to a decision 1446, at which the surveillance service 630 may determine whether the added event meets one or more additional criteria for determining whether it is likely related to the same incident as the event under review. In other implementations, the surveillance service 630 may omit the decision 1446 and instead simply treat the added event from the same monitored location 602 as being related to the event under review.

When employed, the decision 1446 may involve determining whether the added event occurred within a time window keyed off the timestamp 306 of the event that is being actively reviewed by the agent 104. For example, in some implementations, the surveillance service 630 may determine whether the timestamp 306 for the added event indicates that event occurred within a time window that begins five minutes before and ends five minutes after the time indicated by the timestamp 306 of the event being actively reviewed by the monitoring agent 104. Time windows measured in other ways and/or of other durations may alternatively be used in connection with the decision 1446 to optimize performance of the system. Further, in some implementations, different or additional relatedness criteria may be employed in connection with the decision 1446 for optimization purposes.

When, at the decision 1446, the surveillance service 630 determines that the added event meets the additional criteria for determining whether it is likely related to the same incident as the event under review, the routine 1440 may proceed to a step 1448, at which the surveillance service 630 may set the status indicator 316 for the added event in the status table 302 to "Hold."

At a step 1450 of the routine 1440, the surveillance service 630 may link the newly added event to the event with the "Reviewing" status indicator 316. In some implementations, such linking may be accomplished by adding the event ID 304 of the event being actively reviewed as a linked event 318 for the newly added event, in a similar fashion as described above in connection with the step 1434 of the routine 1420 (shown in FIG. 14C).

When, at the decision 1446, the surveillance service 630 determines that the added event does not meet the additional criteria for determining whether it is likely related to the same incident as the event under review, the routine 1440 may proceed to a step 1452, at which the surveillance service 630 may set the status indicator 316 for the newly added event to "New.

When, at the decision 1444 (described above), the surveillance service 630 determines that a monitoring agent 104 is not actively reviewing another event at the same location as the newly detected event, the routine 1440 may proceed to the step 1452, at which the surveillance service 630 may set the status indicator 316 for the newly added event to "New."

FIGS. 14E, 14F, and 14G show example routines 1460, 1470 and 1480, respectively, that may be performed by the surveillance service 630 to update that status indicators 316 in the status table 302 of events that are linked to an event has been actively reviewed by a monitoring agent 104 in response to a change to the status indicator 316 for the actively reviewed event. Such changes to the status indicator 316 of an actively reviewed event may occur, for example, in response to the "status change" decisions 1514, 1518, and 1520 that may be made by the surveillance service 630, as described below in connection with FIG. 15.

As shown in FIG. 14E, the routine 1460 may begin at a step 1462, at which the surveillance service 630 may determine (e.g., by detecting a state change to a status indicator 316 in the status table 302) that the status of an event reflected in the status table 302 has changed from "Reviewing" to "New."

At a step 1464 of the routine 1460, the surveillance service 630 may identify (e.g., by evaluating the current contents of the status table 302) one or more events in the status table 302 that (A) have "Hold" status indicators 316, and (B) are linked to the event that experienced the change of status from "Reviewing" to "New."

At a step 1466 of the routine 1460, the surveillance service 630 may change the status indicator 316 of the events identified at the step 1464 from "Hold" to "New."

At a step 1468 of the routine 1460, the surveillance service 630 may un-link the events identified at the step 1464 from the event whose status was changed from "Reviewing" to "New," e.g., by removing the event ID of the reviewed event from the linked event(s) fields of the identified events.

As shown in FIG. 14F, the routine 1470 may begin at a step 1472, at which the surveillance service 630 may determine (e.g., by detecting a state change to a status indicator 316 in the status table 302) that the status of an event reflected in the status table 302 has changed from "Reviewing" to "Clear." Comparing the versions of the status tables 302 shown in FIGS. 4A and 4B, for example, the status indicator 316 for the event "E1" has changed from "Reviewing" to "Clear."

At a step 1474 of the routine 1470, the surveillance service 630 may identify (e.g., by evaluating the current contents of the status table 302) one or more events in the status table 302 that (A) have "Hold" status indicators 316, and (B) are linked to the event that experienced the change of status from "Reviewing" to "Clear."

At a step 1476 of the routine 1470, the surveillance service 630 may change the status indicator 316 of the events identified at the step 1474 from "Hold" to "Clear." In the example scenario shown in FIG. 4B, for example, the status indicators 316 for the events "E2" and "E4" have been changed to "Clear."

At a step 1478 of the routine 1470, the surveillance service 630 may de-assign the event whose status was changed from "Reviewing" to "Clear" from the monitoring agent 104 who actively reviewed that event, e.g., by changing the agent ID field for that event to "Unassigned." In the example scenario shown in FIG. 4B, for example, the agent ID field for the event "E1" has been changed to "Unassigned."

As shown in FIG. 14G, the routine 1480 may begin at a step 1482, at which the surveillance service 630 may determine (e.g., by detecting a state change to a status indicator 316 in the status table 302) that the status of an event reflected in the status table 302 has changed from "Reviewing" to "Threat." In the version of the status table 302 shown in FIG. 4B, for example, the status indicator 316 for the event "E3" has been changed to "Threat."

At a step 1484 of the routine 1480, the surveillance service 630 may identify (e.g., by evaluating the current contents of the status table 302) one or more events in the status table 302 that (A) have "Hold" status indicators 316, and (B) are linked to the event that experienced the change of status from "Reviewing" to "Threat."

At a step 1486 of the routine 1480, the surveillance service 630 may change the status indicator 316 of the events identified at the step 1484 from "Hold" to "Threat."

At a step 1488 of the routine 1480, the surveillance service 630 may de-assign the event whose status was changed from "Reviewing" to "Threat" from the monitoring agent 104 who actively reviewed that event, e.g., by changing the agent ID field for that event to "Unassigned." In the example scenario shown in FIG. 4B, for example, the agent ID field for the event "E3" has been changed to "Unassigned."

Figure 15:
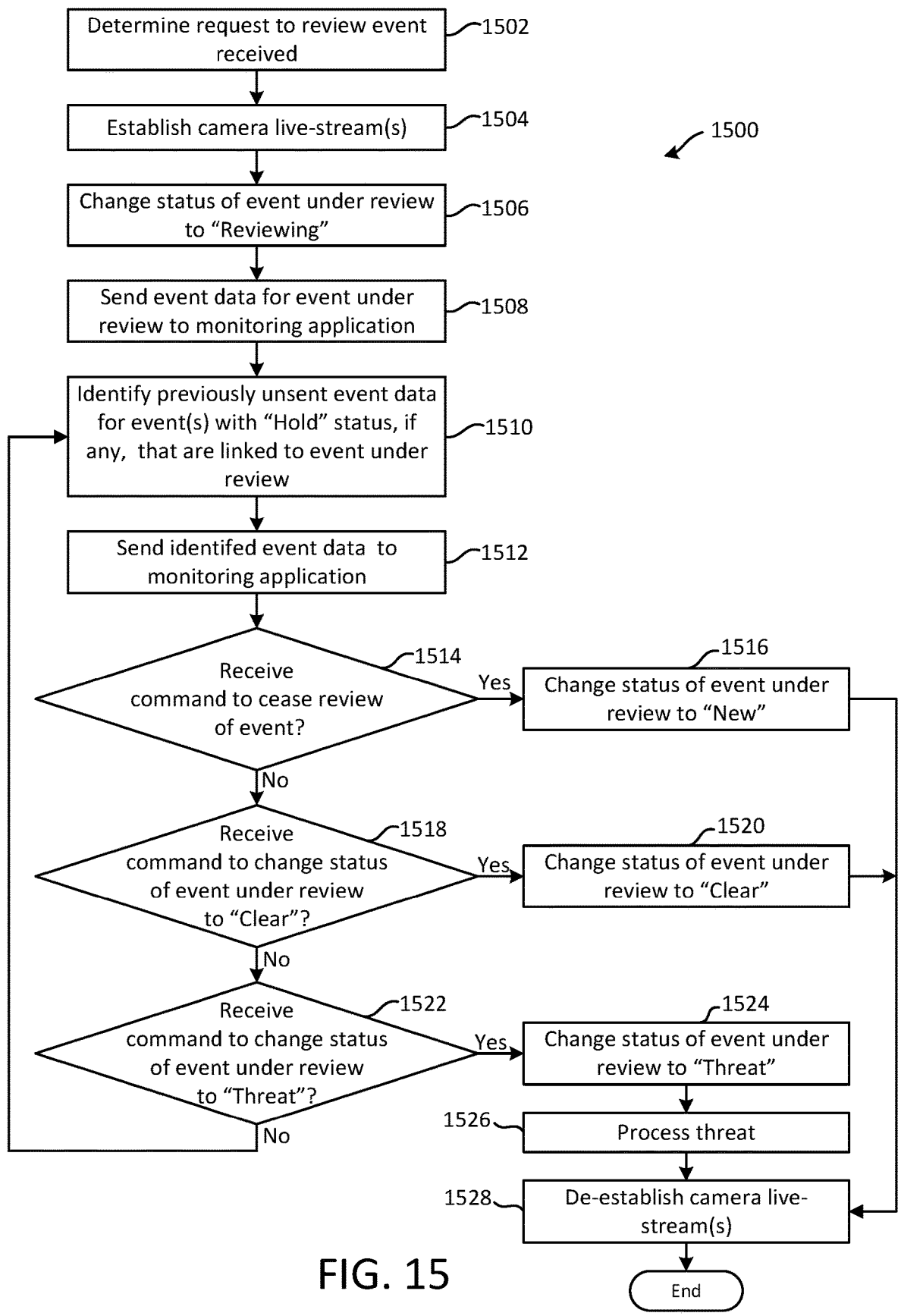
FIG. 15 is a flowchart showing an example routine that may be executed by one or more components of the surveillance service disclosed herein to process commands received from a monitoring application operated by a monitoring agent, in accordance with some implementations of the present disclosure.

FIG. 15 is a flowchart showing an example routine 1500 that may be executed by one or more components of the surveillance service 630 (e.g., the monitoring service 1040 shown in FIG. 10) to process commands received from a monitoring application 632 operated by a monitoring agent 104 (e.g., per the arrow 326 shown in FIG. 3), in accordance with some implementations of the present disclosure.

As shown in FIG. 15, the routine 1500 may begin at a step 1502, at which the surveillance service 630 may determine (e.g., based on an evaluation of received inputs) that it has received a command from a monitoring application 632 corresponding to a request by a monitoring agent 104 to actively review an event (e.g., by selecting one of the event windows 106 presented on the screen 102 shown in FIG. 1).

At a step 1504 of the routine 1500, the surveillance service 630 may cause the monitoring device 1016 associated with the monitoring application 632 to receive and present (e.g., within one or more of the video feed windows 112 and/or the main viewer window 114 of the screen 110 shown in FIG. 5) live streams from one or more cameras 604 at the monitored location 602. An example process for establishing peer-to-peer connections between the monitoring application 632 and one or more cameras camera 604 at the monitored location 602 for that purpose is described above in connection with FIGS. 12 and 13.

At a step 1506 of the routine 1500, the surveillance service 630 may alter the contents of the status table 302 to change the status indicator 316 of the event under review (i.e., the event for which the request to review was received at the step 1502) to "Reviewing." For example, in the version of the status table 302 shown in FIG. 4A, the surveillance service 630 has set the status indicator 316 of the event "E1" to "Reviewing."

At a step 1508 of the routine 1500, the surveillance service 630 may send event data (e.g., per the arrow 322a shown in FIG. 3) for the event under review to the monitoring application 632 the requesting monitoring agent 104 is operating. As described above in connection with FIG. 5, in some implementations, such event data may be used to populate one or more event data windows 502 of the screen 504 shown in FIG. 5, or to otherwise present information on the screen 504, to facilitate the monitoring agent's review of the event.

At a step 1510 of the routine 1500, the surveillance service 630 may identify (e.g., by evaluating the current contents of the status table 302) event data for events that (A) have "Hold" status indicators 316 in the status table 302, (B) are linked to the event under review (e.g., by having the event ID of the event under review listed as a linked event 318), and (C) has not yet been sent to the monitoring application 632. When the step 1510 is initially reached during the routine 1500, such event data may include one or more events that (A) had their status changed to "Hold" per the step 1432 of the routine 1420 shown in FIG. 14C, and (B) were linked to the event under review per the step 1434 of the routine 1420 shown in FIG. 14C. When the step 1510 is reached on subsequent occasions (e.g., following a "no" determination at the decision 1522), such event data may include data for newly added events that (A) had their status marked as "Hold" per the step 1448 of the routine 1440 shown in FIG. 14D, and (B) were linked to the event under review per the step 1450 of the routine 1440 shown in FIG. 14D.

At a step 1512 of the routine 1500, the surveillance service 630 may send the event data identified at the step 1510 to the monitoring application 632, e.g., per the arrow 322a shown in FIG. 3). As described above in connection with FIG. 5, in some implementations, such event data for related events may likewise be used to populate one or more event data windows 502 of the screen 504 shown in FIG. 5, or to otherwise present information on the screen 504, to facilitate the monitoring agent's review of the event.

At a decision 1514 of the routine 1500, the surveillance service 630 may determine (e.g., based on an evaluation of received inputs) whether a command has been received, from the monitoring application 632 (e.g., per the arrow 326 shown in FIG. 3) or otherwise, indicating that the monitoring agent 104 has ceased reviewing the event. Such a command can be generated for any of a number of reasons, such as in response to the monitoring agent 104 closing the monitoring application 632, in response to the loss of a network connection between the monitoring application 632 and the surveillance service 630, in response to a detected lack of interaction by the monitoring agent 104 with the monitoring application 632 for an inordinate amount of time, in response to an input provided by the 104 to the monitoring application 632, etc.

When, at the decision 1514, the surveillance service 630 determines (e.g., based on an evaluation of received inputs) that a command to cease review of the event has been received, the routine 1500 may proceed to a step 1516, at which the surveillance service 630 may change the status indicator 316 (in the status table 302) of the event under review to "New." As noted above in connection with the routine 1460 shown in FIG. 14E, changing the status indicator 316 of the event under review in this fashion may trigger the surveillance service 630 to likewise change the status indicator for any linked events to "New" and to also un-link those other events from the event the monitoring agent 104 has ceased reviewing.

Following the step 1516, the routine 1500 may proceed to a step 1528, at which the surveillance service 630 may de-establish the live stream video connections that were established at the step 1504, and the routine 1500 may thereafter terminate.

When, at the decision 1514, the surveillance service 630 determines (e.g., based on an evaluation of received inputs) that a command to cease review of the event has not been received, the routine 1500 may instead proceed to a decision 1518, at which the surveillance service 630 may determine whether a command has been received, from the monitoring application 632 (e.g., per the arrow 326 shown in FIG. 3) or otherwise, indicating that the monitoring agent 104 has provided an input to change the status indicator 316 of the event under review to "Clear." For example, after reviewing the live video feed(s) presented in the video feed windows 112 and/or the main viewer window 114 of the screen 504 (shown in FIG. 5), as well as any event data for the event under review and/or related events that was presented in the event data windows 502 or otherwise, the monitoring agent 104 may have determined that a security concern does not exist for the monitored location 602 and thus provided an input to the monitoring application 632 indicating that event under review can be cleared.

When, at the decision 1518, the surveillance service 630 determines (e.g., based on an evaluation of received inputs) that a command to clear the event under review has been received, the routine 1500 may proceed to a step 1520, at which the surveillance service 630 may change the status indicator 316 (in the status table 302) of the event under review to "Clear." As noted above in connection with the routine 1470 shown in FIG. 14F, changing the status indicator 316 of the event under review in this fashion may trigger the surveillance service 630 to likewise change the status indicator for any linked events to "Clear" and to also de-assign the reviewed event from the monitoring agent 104 who cleared it, thus making room in that monitoring agent's review queue for notifications of other events.

Following the step 1520, the routine 1500 may proceed to the step 1528, at which the surveillance service 630 may de-establish the live stream video connections that were established at the step 1504, and the routine 1500 may thereafter terminate.

When, at the decision 1518, the surveillance service 630 determines (e.g., based on an evaluation of received inputs) that a command to clear the event has not been received, the routine 1500 may instead proceed to a decision 1522, at which the surveillance service 630 may determine whether a command has been received, from the monitoring application 632 (e.g., per the arrow 326 shown in FIG. 3) or otherwise, indicating that the monitoring agent 104 has provided an input to change the status indicator 316 of the event under review to "Threat."

When, at the decision 1522, the surveillance service 630 determines (e.g., based on an evaluation of received inputs) that a command to classify the event under review as a threat has not been received, the routine 1500 may return to the step 1510 (described above).

When, on the other hand, the surveillance service 630 determines (per the decision 1522) that a command to classify the event as a threat has been received, the routine 1500 may instead proceed to a step 1524, at which the surveillance service 630 may change the status indicator 316 (in the status table 302) of the event under review to "Threat."

At the step 1526 of the routine 1500, the surveillance service 630 may take any of a number of possible actions to address the identified threat at the monitored location 602, such as triggering an alarm at the monitored location 602, notifying the police, notifying the customer, etc.

Following the step 1526, the routine 1500 may proceed to the step 1528, at which the surveillance service 630 may de-establish the live stream video connections that were established at the step 1504, and the routine 1500 may thereafter terminate.

FIG. 16 is a flow diagram illustrating an example routine 1600 that may performed by one or more components of the surveillance service 630 (e.g., the monitoring service 1040 shown in FIG. 10) to cause a device operated by a customer to present information about detected events at a monitored location 602 in a grouped fashion, e.g., based on the identifiers of linked events 318 that have been added to the status table 302 in response to monitoring agents 104 actively reviewing certain events.

As shown in FIG. 16, the routine 1600 may begin at a step 1602, at which the surveillance service 630 may determine to notify a customer about a particular event. In some circumstances, for example, following the active review and classification of an event by a monitoring agent 104 (e.g., classifying the event as a threat), the monitoring agent 104 may provide an input to the monitoring application 632 requesting that an event notification be pushed to a customer. In other circumstances, the step 1602 may correspond to a customer operating a smartphone or other computing device to request information about the particular event and/or notifications about recent incidents that have been detected at the monitored location 602.

At a step 1604 of the routine 1600, the surveillance service 630 may identify other events, if any, that are linked to the event for which the notification is to be provided. In some implementations, for example, the surveillance service 630 may identify any other events reflected in the status table that include, as a linked event 318 entry, the event ID of the event for which the notification is to be provided.

At a step 1606 of the routine 1600, the surveillance service 630 may cause a device of the customer (e.g., a smartphone or other computing device) to present information about the particular event as well as the linked events identified at the step 1604. For example, in a circumstance in which a monitoring agent requested that a notification about a particular event be pushed to a customer, the surveillance service 630 may instruct the customer device to display a notification about the particular event, as well as its classification, together with information describing the related events identified at the step 1604, e.g., in an event timeline format. In a circumstance in which a customer requests information about the particular event, the surveillance service 630 may likewise instruct the customer device to display information about the particular event, as well as its classification, together with information describing the related events identified at the step 1604, e.g., in an event timeline format. In a circumstance in which a customer requests information about recent incidents detected at the monitored location 602, the surveillance service 630 may instead instruct the customer device to display, for example, a timeline of incidents, with one or more such incidents possibly including a set of events that have been grouped based on the linked events identified per the step 1604.

Turning now to FIG. 17, a computing device 1700 is illustrated schematically. As shown in FIG. 17, the computing device 1700 may include at least one processor 1702, volatile memory 1704, one or more interfaces 1706, non-volatile memory 1708, and an interconnection mechanism 1714. The non-volatile memory 1708 may include executable code 1710 and, as illustrated, may additionally include at least one data store 1712.

In some implementations, the non-volatile (non-transitory) memory 1708 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. Further in some implementations, the code 1710 stored in the non-volatile memory may include an operating system and one or more applications or programs that are configured to execute under control of the operating system. In some implementations, the code 1710 may additionally or alternatively include specialized firmware and embedded software that is executable without dependence upon a commercially available operating system. Regardless of its configuration, execution of the code 1710 may result in manipulated data that may be stored in the data store 1712 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

The processor 1702 of the computing device 1700 may be embodied by one or more processors that are configured to execute one or more executable instructions, such as a computer program specified by the code 1710, to control the operations of the computing device 1700. The function, operation, or sequence of operations can be hard coded into the circuitry or soft coded by way of instructions held in a memory device (e.g., the volatile memory 1704) and executed by the circuitry. In some implementations, the processor 1702 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors.

Prior to execution of the code 1710, the processor 1702 may copy the code 1710 from the non-volatile memory 1708 to the volatile memory 1704. In some implementations, the volatile memory 1704 may include one or more static or dynamic random access memory (RAM) chips and/or cache memory (e.g. memory disposed on a silicon die of the processor 1702). Volatile memory 1704 may offer a faster response time than a main memory, such as the non-volatile memory 1708.

Through execution of the code 1710, the processor 1702 may control operation of the interfaces 1706. The interfaces 1706 may include network interfaces. Such network interfaces may include one or more physical interfaces (e.g., a radio, an ethernet port, a USB port, etc.) and a software stack including drivers and/or other code 1710 that is configured to communicate with the one or more physical interfaces to support one or more LAN, PAN, and/or WAN standard communication protocols. Such communication protocols may include, for example, TCP and UDP among others. As such, the network interfaces may enable the computing device 1700 to access and communicate with other computing devices via a computer network.

The interface(s) 1706 may include one or more user interfaces. For instance, in some implementations, the user interface(s) 1706 may include user input and/or output devices (e.g., a keyboard, a mouse, a touchscreen, a display, a speaker, a camera, an accelerometer, a biometric scanner, an environmental sensor, etc.) and a software stack including drivers and/or other code 1710 that is configured to communicate with the user input and/or output devices. As such, the user interface(s) 1706 may enable the computing device 1700 to interact with users to receive input and/or render output. The rendered output may include, for example, one or more GUIs including one or more controls configured to display outputs and/or receive inputs. The received inputs may specify values to be stored in the data store 1712. The displayed outputs may indicate values stored in the data store 1712.

The various features of the computing device 1700 described above may communicate with one another via the interconnection mechanism 1714. In some implementations, the interconnection mechanism 1714 may include a communications bus.

FIG. 18 shows an example token 1802, e.g., a JSON Web Token (JWT), that may be employed by various system components as described above. As illustrated, the token 1802 may include a header 1804, a payload 1806, and a signature 1808. In some implementations, the header 1804 may specify a signing technique that was used to generate the signature 1808 based on the content of the header 1804 and/or the payload 1806, as well as a private key. In some implementations, for example, the specified signing technique may involve (A) combining the base64url encoded header and the base64url encoded payload, (B) hashing the combined base64url value with a hashing technique, e.g., SHA256, and (C) encrypting the determined hash using a private key. As such, by validating the signature 1808 using the private key and the specified signing technique, a recipient device may be able to confirm that the content of a token 1802 it receives from another device has not been altered or otherwise compromised. In some implementations, the header 1804 or payload 1806 of the token 1802 may additionally include an identifier of the device for which it was generated, thus enabling the recipient device to confirm that a received token 1802 came from the same device for which that such token 1802 was originally generated, thus restricting the use of the token 1802 by other devices to which it may have been transferred.

The following paragraphs (M1) through (M13) describe examples of methods that may be performed in accordance with the present disclosure.

(M1) A method may involve causing, by a computing system, a first computing device to display a first notification of a first event detected at a monitored location; causing, by the computing system, a second computing device to display a second notification of a second event detected at the monitored location; and causing, by the computing system, the second computing device to cease display of the second notification in response to a change of status of the first event.

(M2) A method may be performed as described in paragraph (M1), wherein the first computing device may be caused to display the first notification at least in part by adding the first notification to a first queue of event notifications without also adding the first notification to a second queue of event notifications; the second computing device may be caused to display the second notification at least in part by adding the second notification to the second queue of event notifications without also adding the second notification to the first queue of event notifications; and the second computing device may be caused to cease display of the second notification at least in part by removing the second notification from the second queue of event notifications.

(M3) A method may be performed as described in paragraph (M1) or paragraph (M2), and may further involve receiving, by the computing system, an input to review the first event; and in response to the input, causing, by the computing system, the first computing device to establish a connection with at least one camera at the monitored location to receive a live video feed from the monitored location.

(M4) A method may be performed as described in paragraph (M3), and may further involve causing, by the computing system, the first computing device to display information about the second event together with the live video feed from the monitored location.

(M5) A method may be performed as described in any of paragraphs (M1) through (M4), and may further involve determining, by the computing system, that the first event is associated with the monitored location; and determining, by the computing system, that the second event is associated with the monitored location; wherein the second computing device may be caused to cease display of the second notification further based at least in part on the first event being associated with the monitored location and the second event being associated with the monitored location.

(M6) A method may be performed as described in any of paragraphs (M1) through (M5), and may further involve causing the first computing device to display the first notification at least in part by sending, from the computing system to the first computing device, a first video clip corresponding to the first event; and causing the second computing device to display the second notification at least in part by sending, from the computing system to the second computing device, a second video clip corresponding to the second event.

(M7) A method may be performed as described in any of paragraphs (M1) through (M6), and may further involve, after causing the second computing device to cease display of the second notification, determining, by the computing system, that a third event was detected at the monitored location; and refraining, by the computing system, from causing the second computing device to display a third notification of the third event based at least in part on the change of status of the first event.

(M8) A method may involve determining, by a computing system, that a first computing device received an input associated with a first notification, the first notification being indicative of a first event detected at a location; based at least in part on receipt of the input, causing, by the computing system, a second computing device to cease display of a second notification, the second notification being indicative of a second event, different from the first event, at the location.

(M9) A method may be performed as described in paragraph (M8), wherein the first computing device may be caused to display the first notification at least in part by adding the first notification to a first queue of event notifications without also adding the first notification to a second queue of event notifications; the second computing device may be caused to display the second notification at least in part by adding the second notification to the second queue of event notifications without also adding the second notification to the first queue of event notifications; and the second computing device may be caused to cease display of the second notification at least in part by removing the second notification from the second queue of event notifications.

(M10) A method may be performed as described in paragraph (M8) or paragraph (M9), wherein the first computing device may be caused to receive a live video feed from the location based at least in part on the input.

(M11) A method may be performed as described in any of paragraphs (M8) through (M10), and may further involve determining, by the computing system, that the first event is associated with the location; and determining, by the computing system, that the second event is associated with the location; and wherein the second computing device may be caused to cease display of the second notification further based at least in part on the first event being associated with the location and the second event being associated with the location.

(M12) A method may be performed as described in any of paragraphs (M8) through (M11), and may further involve causing the first computing device to display the first notification at least in part by sending, from the computing system to the first computing device, a first video clip corresponding to the first event; and causing the second computing device to display the second notification at least in part by sending, from the computing system to the second computing device, a second video clip corresponding to the second event.

(M13) A method may be performed as described in any of paragraphs (M8) through (M12), and may further involve, after causing the second computing device to cease display of the second notification, determining, by the computing system, that a third event was detected at the location; and refraining, by the computing system, from causing the second computing device to display a third notification of the third event based at least in part on the receipt of the input.

The following paragraphs (S1) through (S13) describe examples of apparatuses and/or systems that may be configured in accordance with the present disclosure.

(S1) A system may include at least one processor, and at least one computer-readable medium encoded with instructions which, when executed by the at least one processor, cause the system to cause a first computing device to display a first notification of a first event detected at a monitored location, to cause a second computing device to display a second notification of a second event detected at the monitored location, and to cause the second computing device to cease display of the second notification based at least in part on a determination that the first computing device is receiving a live video feed from the monitored location.

(S2) A system may be configured as described in paragraph (S1), wherein the at least one computer-readable medium may be further encoded with additional instructions which, when executed by the at least one processor, further cause the system to cause the first computing device to display the first notification at least in part by adding the first notification to a first queue of event notifications without also adding the first notification to a second queue of event notifications, to cause the second computing device to display the second notification at least in part by adding the second notification to the second queue of event notifications without also adding the second notification to the first queue of event notifications, and to cause the second computing device to cease display of the second notification at least in part by removing the second notification from the second queue of event notifications.

(S3) A system may be configured as described in paragraph (S1) or paragraph (S2), wherein the at least one computer-readable medium may be further encoded with additional instructions which, when executed by the at least one processor, further cause the system to receive an input to review the first event, and to, in response to the input, cause the first computing device to establish a connection with at least one camera at the monitored location to receive a live video feed from the monitored location.

(S4) A system may be configured as described in paragraph (S3), wherein the at least one computer-readable medium may be further encoded with additional instructions which, when executed by the at least one processor, further cause the system to cause the first computing device to display information about the second event together with the live video feed from the monitored location.

(S5) A system may be configured as described in any of paragraphs (S1) through (S4), wherein the at least one computer-readable medium may be further encoded with additional instructions which, when executed by the at least one processor, further cause the system to determine that the first event is associated with the monitored location, to determine that the second event is associated with the monitored location, and to cause the second computing device to cease display of the second notification further based at least in part on the first event being associated with the monitored location and the second event being associated with the monitored location.

(S6) A system may be configured as described in any of paragraphs (S1) through (S5), wherein the at least one computer-readable medium may be further encoded with additional instructions which, when executed by the at least one processor, further cause the system to cause the first computing device to display the first notification at least in part by sending, to the first computing device, a first video clip corresponding to the first event, and to cause the second computing device to display the second notification at least in part by sending, to the second computing device, a second video clip corresponding to the second event.

(S7) A system may be configured as described in any of paragraphs (S1) through (S6), wherein the at least one computer-readable medium may be further encoded with additional instructions which, when executed by the at least one processor, further cause the system to, after causing the second computing device to cease display of the second notification, determine that a third event was detected at the monitored location, and to refrain from causing the second computing device to display a third notification of the third event based at least in part on the change of status of the first event.

(S8) A system may include at least one processor, and at least one computer-readable medium encoded with instructions which, when executed by the at least one processor, cause the system to determine that a first computing device received an input associated with a first notification, the first notification being indicative of a first event detected at a location, to cause, based at least in part on receipt of the input, a second computing device to cease display of a second notification, the second notification being indicative of a second event, different from the first event, at the location.

(S9) A system may be configured as described in paragraph (S8), wherein the at least one computer-readable medium may be further encoded with additional instructions which, when executed by the at least one processor, further cause the system to cause the first computing device to display the first notification at least in part by adding the first notification to a first queue of event notifications without also adding the first notification to a second queue of event notifications, to cause the second computing device to display the second notification at least in part by adding the second notification to the second queue of event notifications without also adding the second notification to the first queue of event notifications, and to cause the second computing device to cease display of the second notification at least in part by removing the second notification from the second queue of event notifications.

(S10) A system may be configured as described in paragraph (S8) or paragraph (S9), wherein the at least one computer-readable medium may be further encoded with additional instructions which, when executed by the at least one processor, further cause the system to cause the first computing device to receive a live video feed from the location based at least in part on the input.

(S11) A system may be configured as described in any of paragraphs (S8) through (S10), wherein the at least one computer-readable medium may be further encoded with additional instructions which, when executed by the at least one processor, further cause the system to determine that the first event is associated with the location, to determine that the second event is associated with the location, and to cause the second computing device to cease display of the second notification further based at least in part on the first event being associated with the location and the second event being associated with the location.

(S12) A system may be configured as described in any of paragraphs (S8) through (S 11), wherein the at least one computer-readable medium may be further encoded with additional instructions which, when executed by the at least one processor, further cause the system to cause the first computing device to display the first notification at least in part by sending, from the computing system to the first computing device, a first video clip corresponding to the first event, and to cause the second computing device to display the second notification at least in part by sending, from the computing system to the second computing device, a second video clip corresponding to the second event.

(S13) A system may be configured as described in any of paragraphs (S8) through (S12), wherein the at least one computer-readable medium may be further encoded with additional instructions which, when executed by the at least one processor, further cause the system to determine, after causing the second computing device to cease display of the second notification, that a third event was detected at the location, and to refrain from causing the second computing device to display a third notification of the third event based at least in part on the receipt of the input.

The following paragraphs (CRM1) through (CRM13) describe examples of computer-readable media that may be configured in accordance with the present disclosure.

(CRM1) At least one non-transitory computer-readable medium may be encoded with instructions which, when executed by at least one processor of a system, cause the system to cause a first computing device to display a first notification of a first event detected at a monitored location, to cause a second computing device to display a second notification of a second event detected at the monitored location, and to cause the second computing device to cease display of the second notification in response to a change of status of the first event.

(CRM2) At least one non-transitory computer-readable medium may be configured as described in paragraph (CRM1), and may be further encoded with additional instructions which, when executed by the at least one processor, further cause the system to cause the first computing device to display the first notification at least in part by adding the first notification to a first queue of event notifications without also adding the first notification to a second queue of event notifications, to cause the second computing device to display the second notification at least in part by adding the second notification to the second queue of event notifications without also adding the second notification to the first queue of event notifications, and to cause the second computing device to cease display of the second notification at least in part by removing the second notification from the second queue of event notifications.

(CRM3) At least one non-transitory computer-readable medium may be configured as described in paragraph (CRM1) or paragraph (CRM2), and may be further encoded with additional instructions which, when executed by the at least one processor, further cause the system to receive an input to review the first event, and to, in response to the input, cause the first computing device to establish a connection with at least one camera at the monitored location to receive a live video feed from the monitored location.

(CRM4) At least one non-transitory computer-readable medium may be configured as described in paragraph (CRM3), and may be further encoded with additional instructions which, when executed by the at least one processor, further cause the system to cause the first computing device to display information about the second event together with the live video feed from the monitored location.

(CRM5) At least one non-transitory computer-readable medium may be configured as described in any of paragraphs (CRM1) through (CRM4), and may be further encoded with additional instructions which, when executed by the at least one processor, further cause the system to determine that the first event is associated with the monitored location, to determine that the second event is associated with the monitored location, and to cause the second computing device to cease display of the second notification further based at least in part on the first event being associated with the monitored location and the second event being associated with the monitored location.

(CRM6) At least one non-transitory computer-readable medium may be configured as described in any of paragraphs (CRM1) through (CRM5), and may be further encoded with additional instructions which, when executed by the at least one processor, further cause the system to cause the first computing device to display the first notification at least in part by sending, to the first computing device, a first video clip corresponding to the first event, and to cause the second computing device to display the second notification at least in part by sending, to the second computing device, a second video clip corresponding to the second event.

(CRM7) At least one non-transitory computer-readable medium may be configured as described in any of paragraphs (CRM1) through (CRM6), and may be further encoded with additional instructions which, when executed by the at least one processor, further cause the system to, after causing the second computing device to cease display of the second notification, determine that a third event was detected at the monitored location, and to refrain from causing the second computing device to display a third notification of the third event based at least in part on the change of status of the first event.

(CRM8) At least one non-transitory computer-readable medium may be encoded with instructions which, when executed by the at least one processor of a system, cause a system to determine that a first computing device received an input associated with a first notification, the first notification being indicative of a first event detected at a location, to cause, based at least in part on receipt of the input, a second computing device to cease display of a second notification, the second notification being indicative of a second event, different from the first event, at the location.

(CRM9) At least one non-transitory computer-readable medium may be configured as described in paragraph (CRM8), and may be further encoded with additional instructions which, when executed by the at least one processor, further cause the system to cause the first computing device to display the first notification at least in part by adding the first notification to a first queue of event notifications without also adding the first notification to a second queue of event notifications, to cause the second computing device to display the second notification at least in part by adding the second notification to the second queue of event notifications without also adding the second notification to the first queue of event notifications, and to cause the second computing device to cease display of the second notification at least in part by removing the second notification from the second queue of event notifications.

(CRM10) At least one non-transitory computer-readable medium may be configured as described in paragraph (CRM8) or paragraph (CRM9), and may be further encoded with additional instructions which, when executed by the at least one processor, further cause the system to cause the first computing device to receive a live video feed from the location based at least in part on the input.

(CRM11) At least one non-transitory computer-readable medium may be configured as described in any of paragraphs (CRM8) through (CRM10), and may be further encoded with additional instructions which, when executed by the at least one processor, further cause the system to determine that the first event is associated with the location, to determine that the second event is associated with the location, and to cause the second computing device to cease display of the second notification further based at least in part on the first event being associated with the location and the second event being associated with the location.

(CRM12) At least one non-transitory computer-readable medium may be configured as described in any of paragraphs (CRM8) through (CRM11), and may be further encoded with additional instructions which, when executed by the at least one processor, further cause the system to cause the first computing device to display the first notification at least in part by sending, from the computing system to the first computing device, a first video clip corresponding to the first event, and to cause the second computing device to display the second notification at least in part by sending, from the computing system to the second computing device, a second video clip corresponding to the second event.

(CRM13) At least one non-transitory computer-readable medium may be configured as described in any of paragraphs (CRM8) through (CRM12), and may be further encoded with additional instructions which, when executed by the at least one processor, further cause the system to determine, after causing the second computing device to cease display of the second notification, that a third event was detected at the location, and to refrain from causing the second computing device to display a third notification of the third event based at least in part on the receipt of the input.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "of" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method, comprising:
    sending, from a computing system to a first computing device, first data that causes the first computing device to display a first notification of a first event detected at a monitored location;
    sending, from the computing system to a second computing device, second data that causes the second computing device to display a second notification of a second event detected at the monitored location;
    receiving, by the computing system, an indication that the first computing device is being used to review an incident at the monitored location; and
    causing, by the computing system, the second computing device to cease display of the second notification based at least in part on the indication.

2. The method of claim 1, further comprising:
    adding the first notification to a first queue of event notifications to be reviewed via the first computing device while refraining from adding the first notification to a second queue of event notifications to be reviewed via the second computing device;
adding the second notification to the second queue of event notifications while refraining from adding the second notification to the first queue of event notifications; and
causing the second computing device to cease display of the second notification further comprises removing the second notification from the second queue of event notifications.

3. The method of claim 1, further comprising:
in response to the indication, establishing a connection between the first computing device and a camera at the monitored location to enable the first computing device to receive video data from the camera.

4. The method of claim 3, further comprising:
causing, by the computing system, the first computing device to display information about the second event together with the video data from the monitored location.

5. The method of claim 1, further comprising:
determining, by the computing system, that the first event occurred at the monitored location; and
determining, by the computing system, that the second event occurred at the monitored location;
wherein causing the second computing device to cease display of the second notification is further based at least in part on the first event having occurred at the monitored location and the second event having occurred at the monitored location.

6. The method of claim 1, wherein:
the first data represents a first video clip of the first event; and
the second data represents a second video clip of the second event.

7. The method of claim 1, further comprising:
after causing the second computing device to cease display of the second notification, determining, by the computing system, that a third event was detected at the monitored location; and
refraining, by the computing system, from causing the second computing device to display a third notification of the third event based at least in part on the indication.

8. The method of claim 1, further comprising:
receiving, by the computing system, first image data acquired by a camera at the monitored location;
processing, by the computing system, the first image data to identify the first event;
receiving, by the computing system, second image data acquired by the camera; and
processing, by the computing system, the second image data to identify the second event.

9. The method of claim 8, further comprising:
generating, by the computing system, the first data to include at least a portion of the first image data to cause the first computing device to display at least one first image of the first event; and
generating, by the computing system, the second data to include at least a portion of the second image data to cause the first computing device to display at least one second image of the second event.

10. The method of claim 8, further comprising:
in response to the indication, establishing a connection between the first computing device and the camera to enable the first computing device to receive video data from the camera.

11. A system, comprising:
at least one processor; and
at least one computer-readable medium encoded with instructions which, when executed by the at least one processor, cause the system to:
send, to a first computing device, first data that causes the first computing device to display a first notification of a first event detected at a monitored location;
send, to a second computing device, second data that causes the second computing device to display a second notification of a second event detected at the monitored location;
receive an indication that the first computing device is being used to review an incident at the monitored location; and
cause the second computing device to cease display of the second notification based at least in part on the indication.

12. The system of claim 11, wherein the at least one computer-readable medium is further encoded with additional instructions which, when executed by the at least one processor, further cause the system to:
add the first notification to a first queue of event notifications to be reviewed via the first computing device while refraining from also adding the first notification to a second queue of event notifications to be reviewed via the second computing device;
add the second notification to the second queue of event notifications while refraining from adding the second notification to the first queue of event notifications; and
cause the second computing device to cease display of the second notification further comprises removing the second notification from the second queue of event notifications.

13. The system of claim 11, wherein the at least one computer-readable medium is further encoded with additional instructions which, when executed by the at least one processor, further cause the system to:
in response to the indication, establish a connection between the first computing device and a camera at the monitored location to enable the first computing device to receive video data from the camera.

14. The system of claim 13, wherein the at least one computer-readable medium is further encoded with additional instructions which, when executed by the at least one processor, further cause the system to:
cause the first computing device to display information about the second event together with the video data from the monitored location.

15. The system of claim 11, wherein the at least one computer-readable medium is further encoded with additional instructions which, when executed by the at least one processor, further cause the system to:
determine that the first event occurred at the monitored location;
determine that the second event occurred at the monitored location; and
cause the second computing device to cease display of the second notification based at least in part on the first event having occurred at the monitored location and the second event having occurred at the monitored location.

16. The system of claim 11, wherein:
the first data represents a first video clip of the first event; and
the second data represents a second video clip of the second event.

17. The system of claim 11, wherein the at least one computer-readable medium is further encoded with additional instructions which, when executed by the at least one processor, further cause the system to:
    after causing the second computing device to cease display of the second notification, determine that a third event was detected at the monitored location; and
    refrain causing the second computing device to display a third notification of the third event based at least in part on the indication.

18. The system of claim 11, wherein the at least one computer-readable medium is further encoded with additional instructions which, when executed by the at least one processor, further cause the system to:
    receive first image data acquired by a camera at the monitored location;
    process the first image data to identify the first event;
    receive second image data acquired by the camera; and
    process the second image data to identify the second event.

19. The system of claim 18, wherein the at least one computer-readable medium is further encoded with additional instructions which, when executed by the at least one processor, further cause the system to:
    generate the first data to include at least a portion of the first image data to cause the first computing device to display at least one first image of the first event; and
    generate the second data to include at least a portion of the second image data to cause the first computing device to display at least one second image of the second event.

20. The system of claim 18, wherein the at least one computer-readable medium is further encoded with additional instructions which, when executed by the at least one processor, further cause the system to:
    in response to the indication, establish a connection between the first computing device and the camera to enable the first computing device to receive video data from the camera.

\* \* \* \* \*